United States Patent
Bertoni et al.

(10) Patent No.: US 7,212,160 B2
(45) Date of Patent: May 1, 2007

(54) LOCATING AN OBJECT OF INTEREST USING BACK TRACKED-RAYS DERIVED FROM MULTIPATH SIGNALS

(75) Inventors: Henry Bertoni, Brooklyn, NY (US); Binay Sugla, Aberdeen, NJ (US)

(73) Assignee: Polytechnic University, Brooklyn, NY (US)

( * ) Notice: Subject to any disclaimer, the term of this patent is extended or adjusted under 35 U.S.C. 154(b) by 38 days.

(21) Appl. No.: 10/780,139

(22) Filed: Feb. 17, 2004

(65) Prior Publication Data

US 2005/0179591 A1  Aug. 18, 2005

(51) Int. Cl.
*G01S 3/02* (2006.01)
(52) U.S. Cl. ...................................... 342/453
(58) Field of Classification Search ................ 342/453
See application file for complete search history.

(56) References Cited

U.S. PATENT DOCUMENTS

| 6,104,345 | A  | * | 8/2000  | Tweg et al. | ................ | 342/417 |
| 6,282,426 | B1 | * | 8/2001  | Wang        | ................ | 342/453 |
| 2002/0196188 | A1 | * | 12/2002 | Holt       | ................ | 342/453 |

OTHER PUBLICATIONS

N.J. Thomas et al., Calculation of mobile location using scatterer information, Electronics Letters, vol. 37(19), p. 1193-1194, Sep. 2001.*

F. A. Katsriku, Propagation Characteristics of Wireless Channels, lecture notes, published at least by Feb. 3, 2003.*
D. Jenn, Overview of Electromagnetic Wave Propagation, lecture notes, published at least by Spring 2003.*
S. Sen et al., Agglomerative model for fuzzy relational clustering (FRC), International Conference of the North American Fuzzy Information Processing Society, p. 267-272, Jul. 2000.*

* cited by examiner

*Primary Examiner*—Thomas H. Tarcza
*Assistant Examiner*—F H Mull
(74) *Attorney, Agent, or Firm*—Straub and Pokotylo; John C. Pokotylo

(57) ABSTRACT

Multipath signals (rays) emanating from an object of interest are processed to locate the object. Multipath signals may be accepted, screened, and associated with a specific object by an observer. Information (time, amplitude, and angle information) may be recorded for each ray. A set of incoming rays associated with a signal from an object are traced back toward the emanating object generating traceback ray segments. Candidate crossings of ray traceback segments are tested for time and/or amplitude consistency with ray information, and candidate crossings with inconsistent amplitude and/or time information may be eliminated from consideration. If there is only one candidate crossing remaining, it may be used to define the object location. Otherwise, the remaining crossings may be grouped, each grouping with a crossing cardinality, and location. Multiple crossings of multiple rays may be grouped into clusters with a cluster cardinality and diameter. The location may then be determined using crossing cardinality, cluster cardinality, and/or cluster diameter.

42 Claims, 16 Drawing Sheets

| RAY | NUMBER OF REFLECTIONS AT VERTICAL SIDES OF BUILDINGS | NUMBER OF DIFFRACTIONS AT VERTICAL BUILDING CORNERS | SURFACES ENCOUNTERED | BUILDINGS THAT A RAY GOES OVER ALONG ITS PATH |
|---|---|---|---|---|
| A (120) | 0 | 0 | NONE | NONE |
| B (122) | 1 | 0 | 3$^{RD}$ BLD WALL (118) | NONE |
| C (124) | 2 | 0 | 1$^{ST}$ BLD WALL (112) AND 2$^{ND}$ BLD WALL (114) | 4$^{TH}$ BUILDING (111) POSSIBLY BY DIFFRATION AT EDGES (115) AND (117) |
| D (126) | 1 | 0 | 2$^{ND}$ BLD WALL (114) | NONE |
| E (128) | 0 | 1 | 2$^{ND}$ BLD CORNER (116) | NONE |
| F (130) | 1 | 1 | 3$^{RD}$ BLD WALL (118) AND 2$^{ND}$ BLD CORNER (116) | NONE |

FIGURE 2

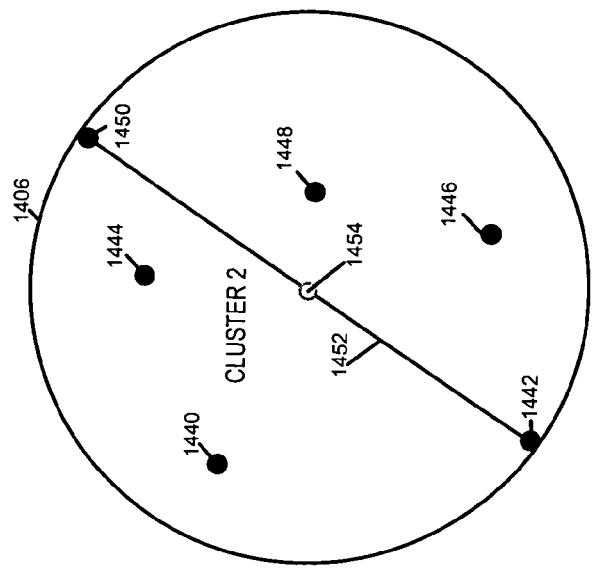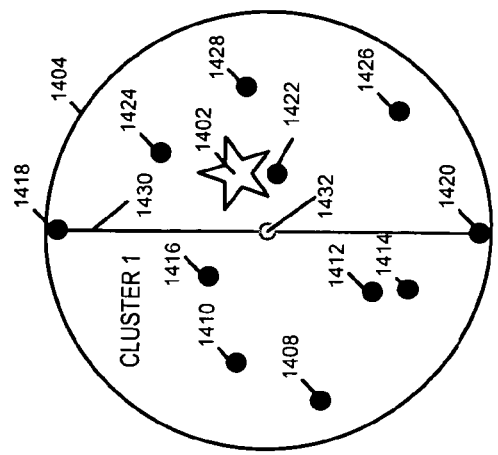
FIGURE 14

LOCATING AN OBJECT OF INTEREST USING BACK TRACKED-RAYS DERIVED FROM MULTIPATH SIGNALS

§ 1. BACKGROUND

§ 1.1 Field of the Invention

The present invention concerns locating an object of interest, such as a mobile or stationary object. More specifically, the present invention concerns locating an object of interest radiating signals in an environment which induces multiple ray paths of the radiated signals.

§ 1.2 Related Art

§ 1.2.1 The Need to Locate Objects of Interest

There are a wide range of applications that could benefit from improved object of interest location techniques. One general application involves locating a scene at which emergency services (e.g., medical, fire, accident, crime, etc.) are needed. In many of these emergency applications, the person attempting to obtain assistance (e.g., with a 911 call) may be in a state of panic, or simply may not know their present location. Regarding medical emergencies specifically, the person attempting to obtain help may be partially incapacitated and unable to provide their present location.

Other potential uses for improved object of interest location techniques may include tracking persons (e.g., prisoners, workers), vehicles (e.g., delivery vehicles, service vehicles, pubic transportation vehicles, private taxi/limousine services, stolen vehicles), cargo, etc.

Object of interest locating techniques could also be useful for aiding a person who is lost, e.g., driving in an unfamiliar city. Such mobile location techniques and improvements could be coupled to mobile communication devices and/or navigation systems providing additional information.

Improved object of interest locating techniques could also be beneficial in a military environment. For example, it would be advantageous if each member of a friendly unit or each vehicle in the unit could be located and/or tracked, e.g., within a hostile city environment, even where obstructions might render other currently used location techniques ineffective. It would also be advantageous if an enemy or hostile unit, individual, or vehicle could be located and/or tracked, e.g., within a city environment, by e.g., their cell phone communications and/or a signature emitted by any of their electronic equipment, even when obstructions might render other currently used location techniques ineffective or too imprecise. In such an application, location techniques that are passive would have any advantage over other techniques, e.g., active radars, which could alert the enemy that they are being monitored.

Note that in many of the above applications, the object of interest cannot (e.g., in the case of a disoriented accident victim), or will not (e.g., in the case of a military enemy target) provide location information.

For many applications of interest it is only a two dimensional (2-D) location of the object on the earth's surface is desired. In other applications it is also desirable to know the elevation of the object above the earth's surface.

In many of the abovementioned applications, response time is a critical factor. Therefore, any improvement over present techniques or any additional location confirmation provided by new locating techniques would be beneficial.

§ 1.2.2 Known Techniques For Determining an Object of Interest's Location and Their Perceived Drawbacks Known techniques for determining an object of interest's location and their perceived drawbacks are introduced in §§ 1.2.2.2 through 1.2.2.4 below. First, however, the concept of multipath rays/signals is introduced in § 1.2.2.1.

§ 1.2.2.1 Multipath Rays and Their Sources

From a source, e.g., a transmitter, an electromagnetic wave may propagate radially, defining a number of rays. The wave's subsequent paths through space may be determined by the laws of ray optics, including geometrical optics and the uniform theory of diffraction. Geometrical optics refers to the process by which high frequency electromagnetic waves are represented in terms of rays consisting of straight-line segments between the source and points of reflection. Reflection occurs when a ray encounters a surface (e.g., a side of a building) and leaves the surface in a single direction, in which the angle of incidence equals the angle of reflection. Diffraction refers to a wave process by which a geometrical ray is scattered into many directions lying on the surface of a cone by the sharp edges or other abrupt changes in the properties of a surface, (e.g., the corner of a building).

Multipath refers to the condition of having electromagnetic waves arriving at a point in space along many different ray paths. Multipath rays arriving at one observation point (referred to simply as "the observer") may include a mixture of rays sourced from a plurality of transmitters situated at different locations. The multipath rays may include a subset of rays transmitted from a single source. Since rays emanating from a single source at a given time may have taken different paths, the rays may arrive at the observer at different points in time, with different amplitudes, and/or with different angles of arrival.

The multipath rays emanating from a source to an observer may reach the observer directly, or after one or more reflections, and/or diffractions. The rays may be classified in four main categories: (i) direct propagation; (ii) rays that experience reflection at generally vertical surfaces (e.g., sides of buildings); (iii) rays that experience diffraction at generally vertical surfaces (e.g., vertical corners of buildings); and (iv) rays that experience a combination of reflection and diffraction at generally vertical surfaces (e.g., the sides and corners of buildings). Note, however, that rays may also undergo reflection and/or diffraction from generally horizontal surfaces (e.g., reflection from the ground and/or diffraction over the tops of buildings). In such cases, the general 2-D ray classifications can be sub-classified as (i) direct with horizontal reflection and/or diffraction; (ii) reflection only with horizontal reflection and/or diffraction; (iii) diffraction only with horizontal reflection and/or diffraction; and reflection and diffraction with horizontal reflection and/or diffraction. Although such rays can be projected onto a 2-D horizontal plane, in such cases, a signal time and/or amplitude should further account for delays and/or attenuation due to reflections and/or diffractions from generally horizontal surfaces.

Thus, direct propagation rays are those that have not encountered obstructions in their paths from source to observer. In such cases, a line of sight is said to exist between the source and observer. This category may also include the sub-category of rays that undergo reflection from the ground and/or pass over buildings by the process of diffraction at the horizontal building edges.

Reflected rays include those that have undergone one or more reflections at generally vertical surfaces (e.g., sides of buildings) but no diffractions at the vertical corners (e.g., of buildings) along their paths from source to observer. This category may also include the sub-category of rays undergo reflection from the ground and/or go over some buildings via diffraction at the horizontal building edges.

Diffracted rays include those that undergo diffraction at generally vertical surfaces (e.g., corners of buildings), but and no reflections (e.g., at the vertical sides of buildings) along its path from source to observer. This category may also include the sub-category of rays that undergo reflection from the ground and/or go over some buildings via diffraction at the horizontal building edges.

A ray that is classified as a combination of reflection and diffraction is one that has undergone at least one reflection at a generally vertical surface (e.g., sides of buildings) and at least one diffraction at a generally vertical corner (e.g., of buildings) along its path from source to receiver. Again, this category may also include the sub-category of rays that undergo reflection from the ground and/or go over some buildings via diffraction at the horizontal building edges.

§ 1.2.2.2 Triangulation and its Perceived Drawbacks

Triangulation measures at least one of the relative time delay, angle of arrival, and amplitude of a signal received at three or more observation points (e.g., base stations) surrounding an object of interest. In the absence of multipath, signals at an observation point arrive directly from an object of interest source with time delay proportional to the distance R, and amplitude inversely proportional to the a power of R. Under these circumstances, the object of interest can be located using any one of the signal properties.

Unfortunately, however, in some environments (e.g., an urban environment), direct propagation paths are not always available between the source and the three observation points. For example, in an urban environment with multipath due to scattering by buildings, it is not uncommon for signals to arrive with angle discrepancy on the order of +/−10°, which corresponds to +/−160 m at a mobile distance of R=1 km from the observation points. Multipath may also result in signals arriving with delays of more than 1 μs, which corresponds to a distance of 300 m. Buildings may also cause shadow fading that may result in variations of the signal of more than +/−6 dB. For signals that depend on distance as $1/R^4$, fading of +/−6 dB is equivalent to a distance variation of 30%, or 300 m at an R=1 km from the observation points. Thus in the presence of buildings or other obstacles to direct ray propagation, the accuracy of the triangulation methods may be severely degraded.

Another drawback to the triangulation method is the need for three receivers at three locations with synchronization and information exchanges between the three locations.

§ 1.2.2.3 GPS and its Perceived Drawbacks

A second approach for locating an object of interest uses a Global Positioning Satellite (GPS) receiver in the object of interest. The GPS receiver uses the time difference of three or more satellite signals to triangulate its location. The accuracy in determining the elevation of the receiver is largely dependent on satellites that are positioned overhead. However, the accuracy of the latitude and longitude is dependent on receiving the signals from satellites at low elevation angles. The signals from these satellites are subject to the same multipath errors that exist when the object of interest is a transmitter rather than a receiver. As a result, the GPS approach can be susceptible to errors in the determined horizontal position of the object of interest similar to those for the triangulation method described above.

Moreover, with some GPS receivers, it is not unusual to be unable to obtain a position fix at numerous locations within a city environment. At many locations within the city, the receiver's antenna may not have a line of sight path to a minimum required satellite set for any position fix. The GPS receiver may have been implemented to filter out received multipath signals to improve accuracy under good observation conditions. Unfortunately, this limits reception in a city environment.

These drawbacks of GPS are in addition to the need for hardware and/or software modifications to the object of interest (e.g., incorporation of an embedded GPS receiver).

Finally, from the viewpoint of an observer, the GPS receiver method is only useful in applications in which the object of interest has a GPS receiver, and perhaps voluntarily shares its location information. In addition, with the GPS method, the sharing of location information between object of interest and observer involves additional communications hardware, the establishment of a communications link, and additional signaling.

§ 1.2.2.4 "Radio Camera" and its Perceived Drawbacks

A third approach for locating an object of interest attempts to use the complete information of the received signal to identify location. Known as location signature or "Radio Camera," the approach requires knowledge of one or more characteristics of the received signal from each of a number of possible candidates object locations to each of a number of observation points (e.g., base stations). Measuring the characteristics obtained at many observation points, a computer program attempts to find the best match to a database of previously recorded signatures. Although the question of uniqueness of the signature is potentially a theoretical limit on the accuracy of the method, it is probably less significant than other mundane sources of error. Major drawbacks of the "radio camera" method are associated with the database of signatures, which is obtained by extensive measurements or predictions. If the database is constructed for very fine grid of locations, it may require a prohibitive number of measurements and be very difficult to manage. For example, if the signature at 10 base stations is used for a 5 m grid then there may be 0.4 million entries needed for a 1 $km^2$ area.

Using a coarser grid can cause problems since the signatures (such as spread of the received signal in angle of arrival, the spread over time, and received power) can vary by a large amount for displacements of the object by distance of the order of 10 m. Thus a database obtained while driving down the middle of the street may result in errors for pedestrians on the sidewalk next to the buildings. Moreover, trucks, and other moving objects can block or scatter signals leading to changes in the signal that cannot be accounted for.

§ 2. SUMMARY OF THE INVENTION

The present invention may locate an object of interest by using multipath signals. A method of the present invention is in contrast to known locating methods, e.g., triangulation, GPS, and "radio camera" which are adversely impacted by multipath signals. Such known locating methods are not highly effective in environments where multipath signals are prevalent, e.g., cities.

One method of the present invention may locate an object of interest emanating signals. The signals emanating from each of a number of objects may be uniquely identifiable by an observer (e.g., a base station) as having been transmitted from a specific object. Signals from a particular object may be associated with the object by: selecting a specific frequency or frequency range, including identity information in the transmitted signal, and/or encoding the signal with a unique (encryption) key known to both the object and observer.

The signals from the source object travel along multiple paths (multiple ray paths) to the observer, e.g., a single base station. One method of the present invention may use a single observation point (e.g., one base station) which is in contrast to the known triangulation locating method requiring three of more base stations, and the "radio camera" locating method requiring many base stations.

In accordance with one embodiment of the present invention, at the observer multiple antennas and/or antenna elements or segments in concert with a receiver and a digital signal processor may be used to receive the multipath ray signals, screen the signals for inclusion within a set of objects being located, and record a set of characteristics for each ray. The set of characteristics for each ray may include arrival time information, amplitude information, and/or direction of arrival information.

For applications that require locating the object in 2-D on the surface of the earth, it is only necessary to have the azimuth angle of the rays in the horizontal plane for direction of arrival information. For applications that required 3-D location, the elevation angles for the rays is also needed. Obtaining elevation angle information requires a more complicated antenna system than is required if only the azimuth angle information is needed.

Next, each of the rays is associated with an object (e.g., one of a number of objects) being located, and relative timing information may be determined for each ray. Static and/or dynamic threshold criteria may be applied to each set of ray characteristics to further screen out undesirable rays. Next, a set of multipath rays corresponding to a transmission signal associated with the object are processed by a ray traceback routine, using database information of the surroundings (e.g. reflection and diffraction information on the buildings/structures). The database used may be considerably smaller in size than the database that would be required by a "radio camera" implementation to achieve a similar accuracy. This traceback operation outputs a set of traceback rays (comprised of ray segments) identifying potential paths of the received rays.

When locating the object in 2-D, the traceback rays may be projected into the horizontal plane. The observer (e.g., base station) may then use a ray crossings routine to determine locations where pairwise (or N-wise, where N≧2) crossings of the traceback rays occur. The pairwise crossing locations may be referred to as candidate locations. Finally, a location determination routine may perform three sub-functions: eliminating false (pairwise) crossings, determining crossings of multiple rays, and determining a "best" location. Multiple pairwise crossings may be eliminated, in accordance with the invention, by testing the pairs of traceback rays which cross at a candidate location for consistency in terms of: relative time delay and/or amplitude. Ray characteristic information on the source rays collected during the reception may be used in the consistency checks.

Remaining pairwise crossings that have not been eliminated may be grouped into crossings of multiple rays. Each crossing of multiple rays may be defined, in accordance with the invention, by an area of accuracy such as a circle of accuracy, encompassing a plurality of pairwise crossings, a cardinality of the crossing (the number of distinct rays included in the pairwise crossings of the circle of accuracy), and/or a location (an approximate crossing location for the multiple rays).

Multiple crossings of multiple rays may be grouped into clusters. Each cluster, in accordance with the invention, may have a diameter, a cluster cardinality, and a cluster location. The cluster diameter is larger than the maximum separation between any two crossings of multiple rays within the cluster. Cluster cardinality is the number of crossings of multiple rays included in the cluster.

The "best" location may be determined, in accordance with the invention, as a function of: crossing cardinality for each crossing of multiple rays, cluster cardinality for each cluster, and/or diameter for each cluster. Location determination between multiple crossings of multiple rays favors the location with maximum cardinality. Location determination between multiple clusters favors a cluster with the smallest diameter, largest cluster cardinality, or some combination thereof.

The methods of the invention are applicable to three dimensional position when elevation angle information of the multipath rays is determined. In this case, candidate locations obtained in 2-D, as described above, are further examined for the elevation of the rays at the crossing point. Note that errors in determining the angle of arrival of the multipath rays by the observer (e.g. the base station) make it unlikely that the traceback rays will have exactly the same elevation at the candidate crossing. The methods to select the "best" location in 2-D may be applied to the third dimension.

In some three dimensional position location determination embodiments of the present invention, volumes of accuracy, such as spheres or cubes of accuracy for example, may be used in place of areas of accuracy such as circles of accuracy.

In some embodiments of the invention, the location determination method may be repeated for the same object so that object velocity, acceleration, and/or heading information may be determined.

In some embodiments of the invention, the determined location, velocity, acceleration, and/or heading information may be conveyed by the observer to the object of interest (source). Such determined information may include position, velocity, acceleration, and/or heading information and, in some embodiments, estimated accuracy information of such information.

§ 3. BRIEF DESCRIPTION OF THE DRAWINGS

FIG. 2 is a table classifying the exemplary source rays shown in FIG. 1.

Figure 9:
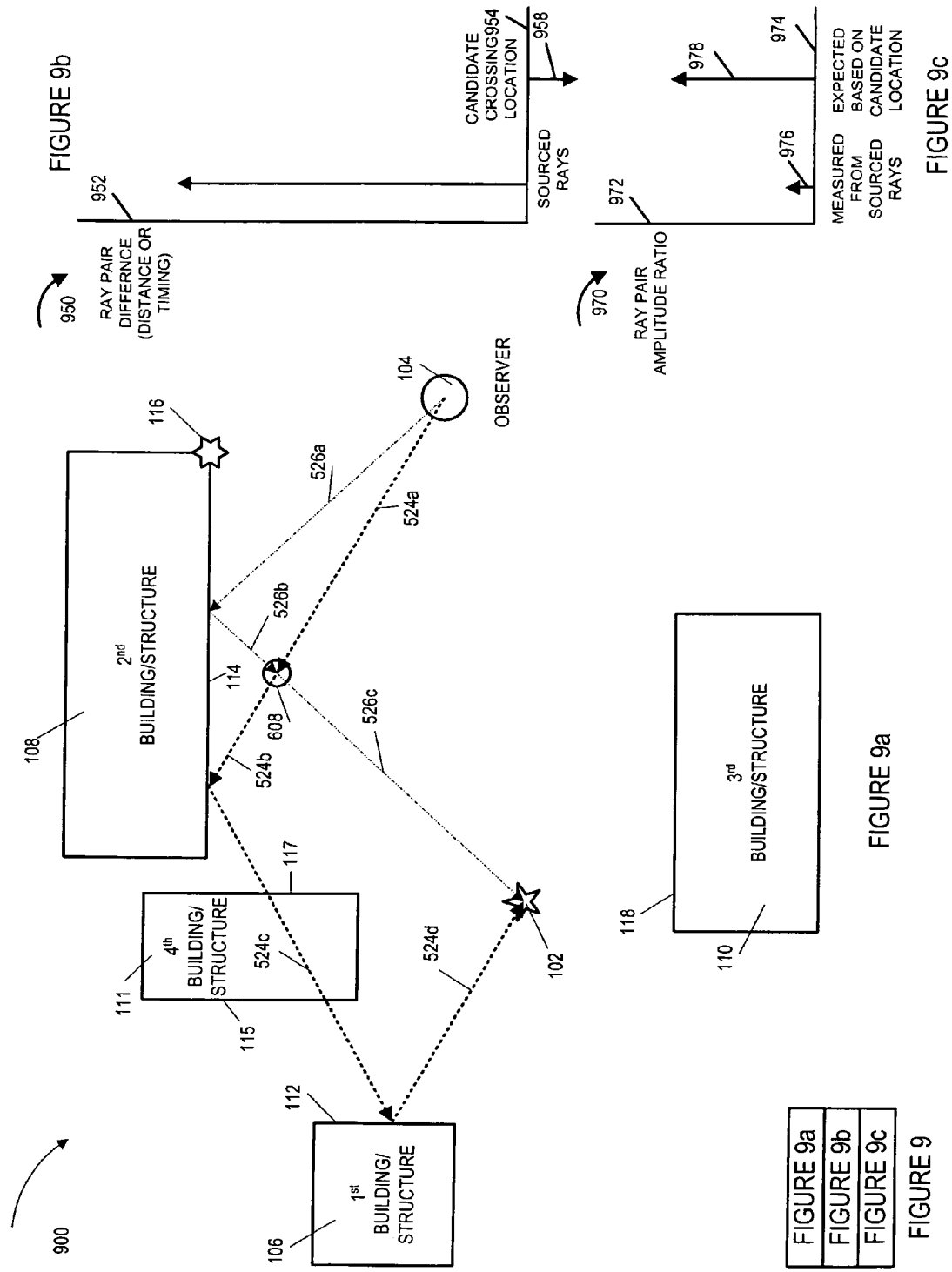

FIG. 9 comprises FIGS. 9a, 9b, and 9c; FIGS. 9a, 9b, and 9c are a block diagram and two graphs, respectively, illustrating a rejected candidate crossing in accordance with the present invention.

Figure 10:
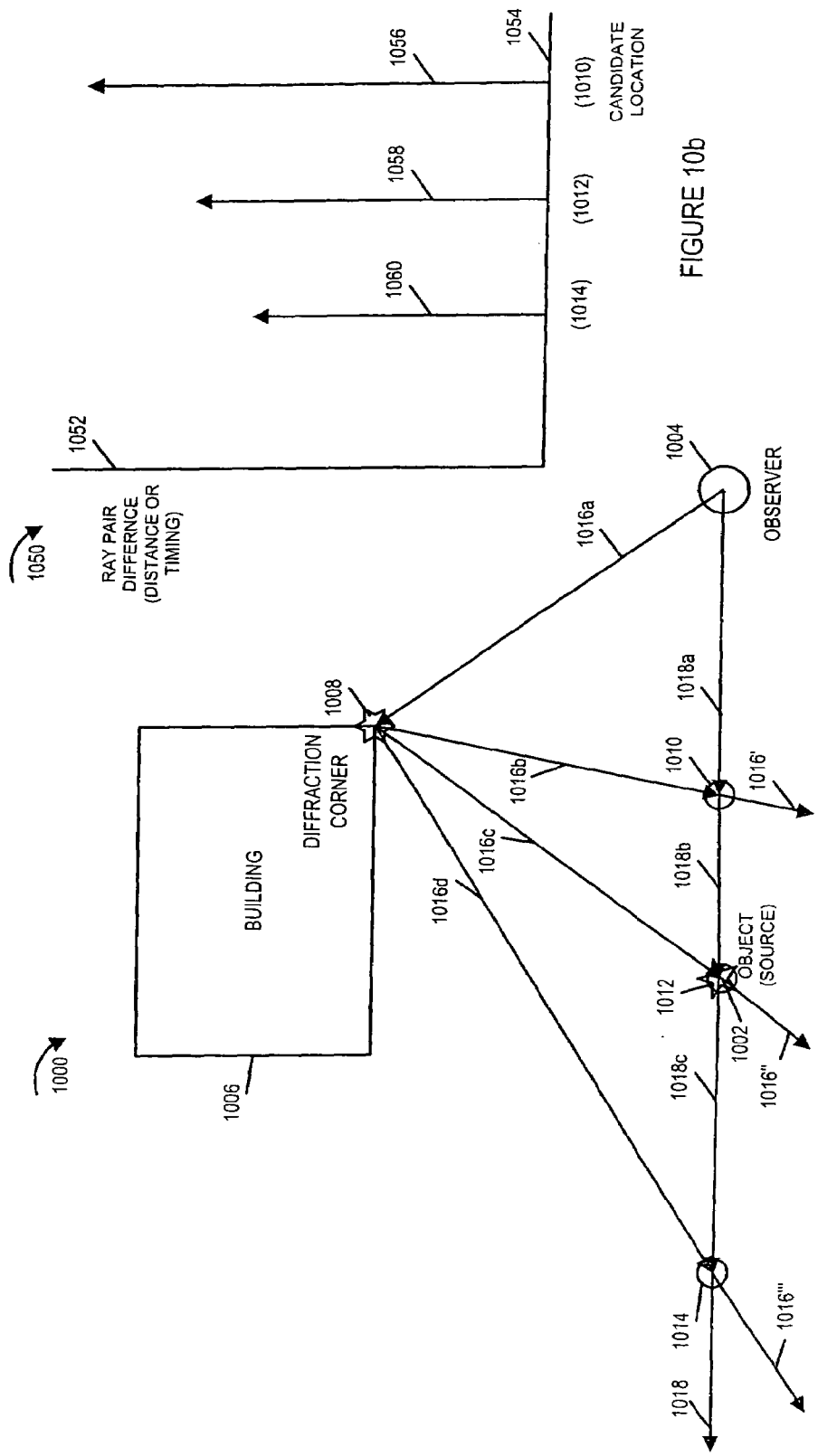

FIG. 10 comprises FIGS. 10a and 10b; FIGS. 10a and 10b are a block diagram and a graph, respectively, illustrating multiple candidate diffraction rays and selection using relative timing/distance consistency in accordance with the present invention.

Figure 11:
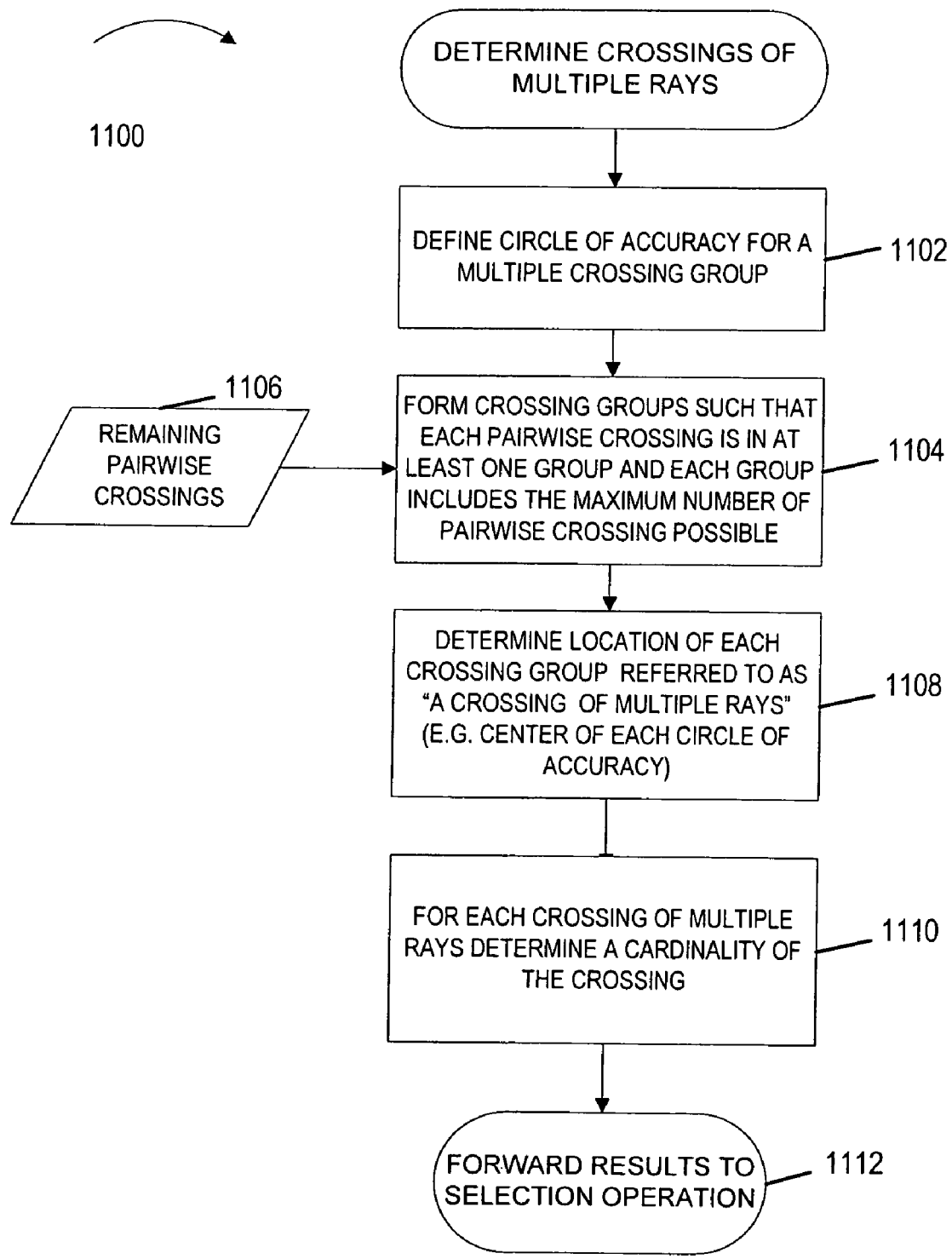

FIG. 11 is a flowchart illustrating an exemplary method that may be used to determine multiple crossing groups in accordance with the present invention.

Figure 12:
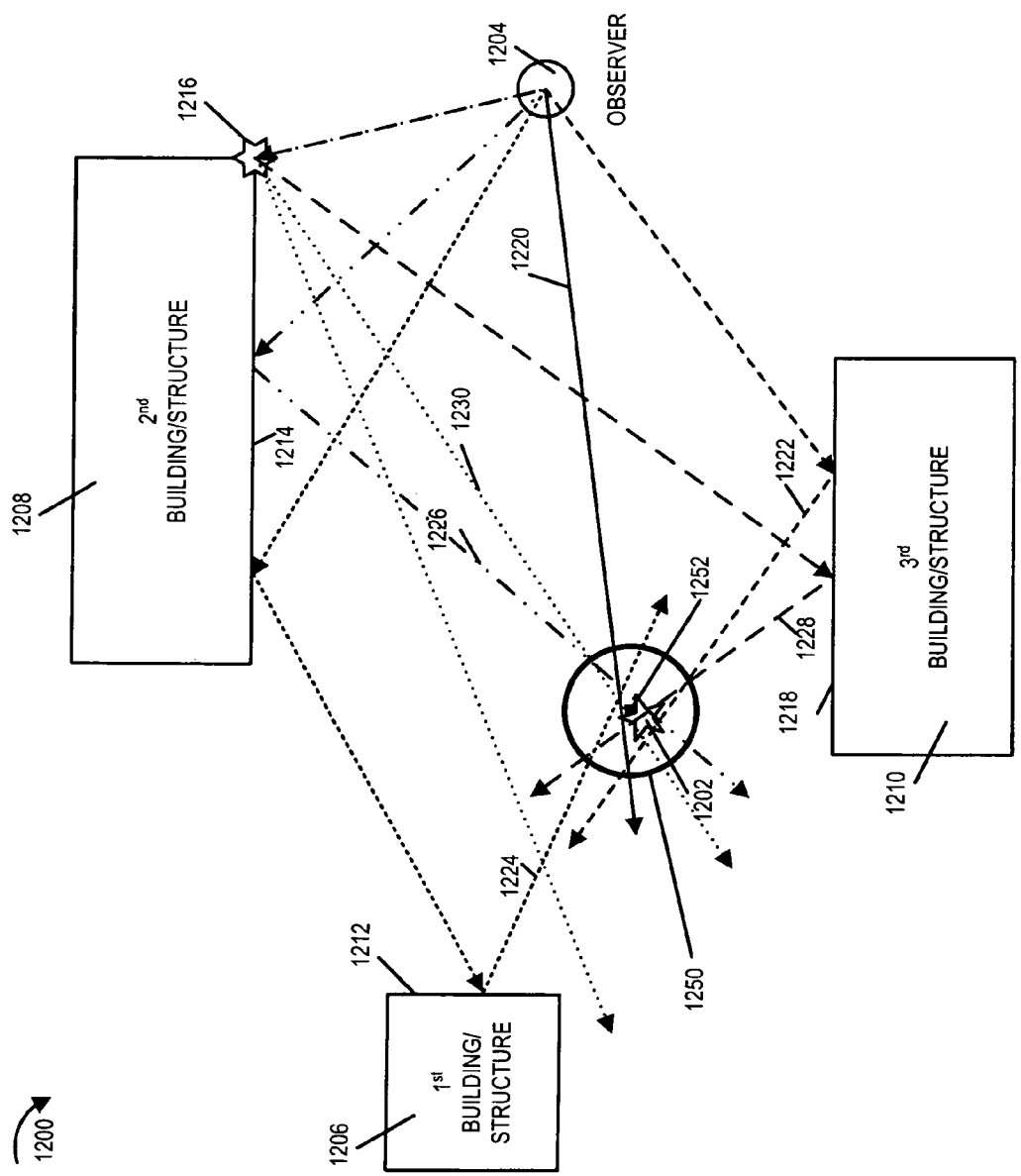

FIG. 12 is a block diagram illustrating an exemplary multiple crossing group in accordance with the present operation.

Figure 13:
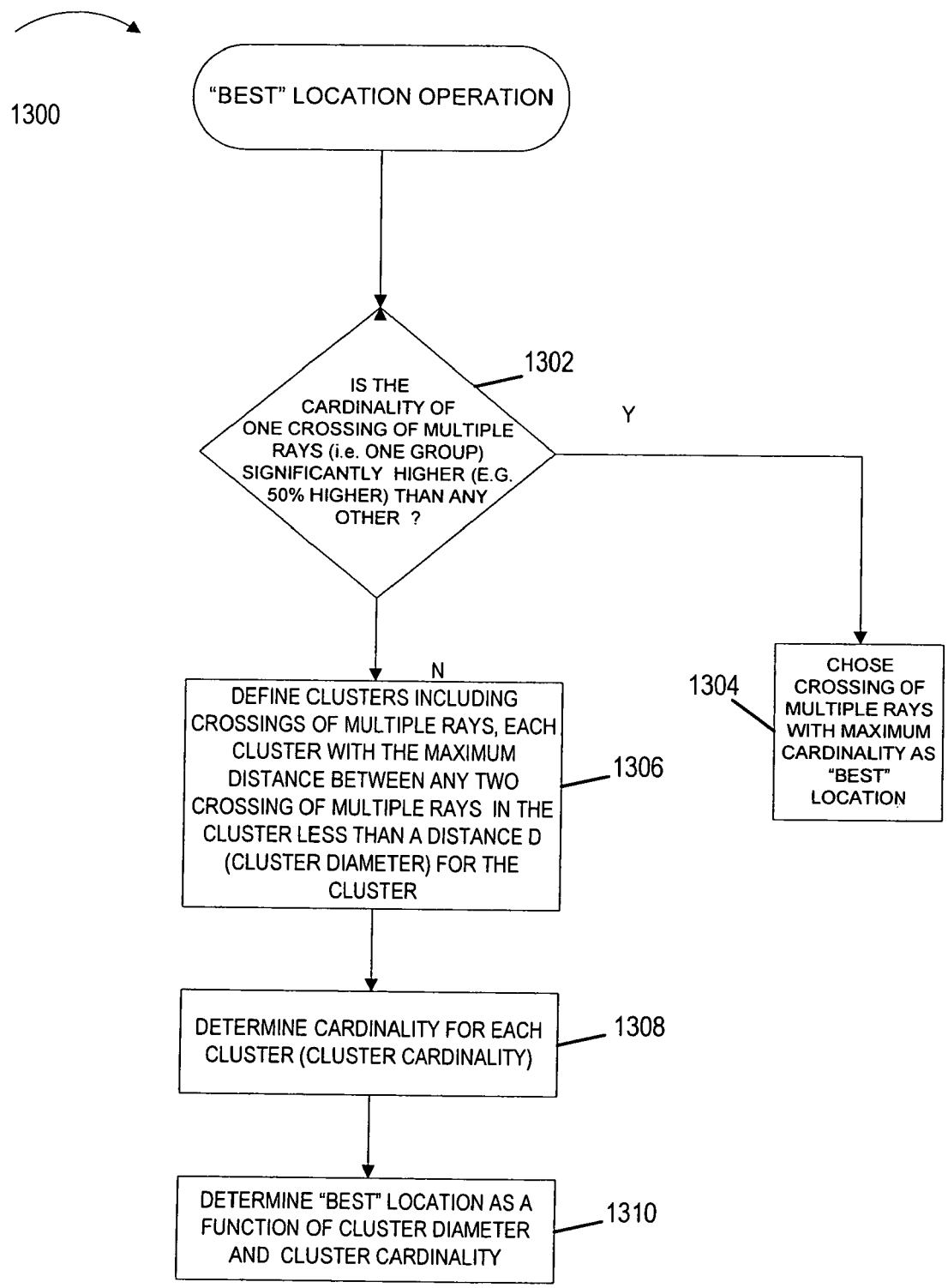

FIG. 13 is a flowchart illustrating an exemplary method that may be used to select a location in accordance with the present invention.

FIG. 14 illustrates exemplary clusters of crossings of multiple rays, in accordance with the invention.

Figure 15:
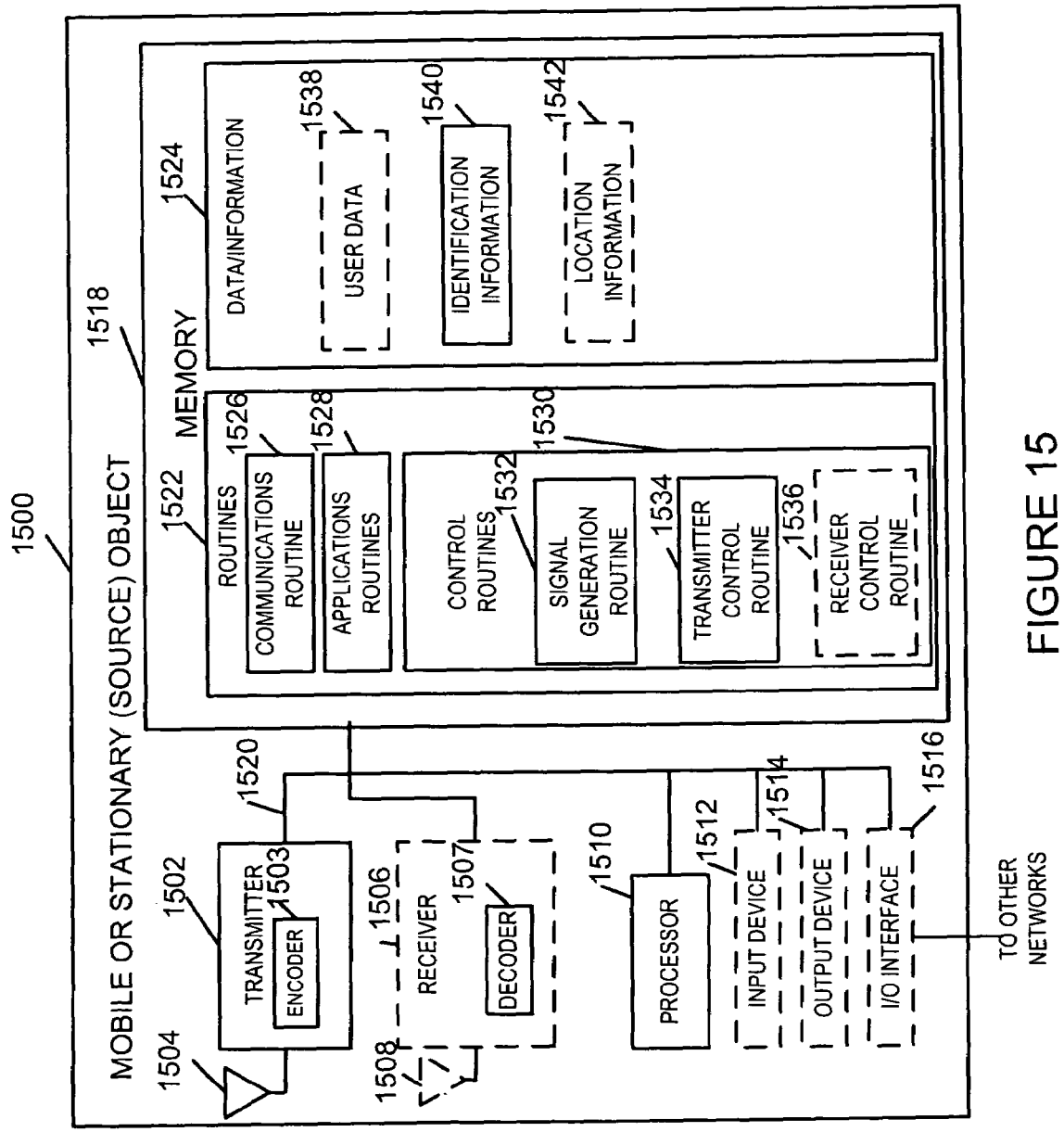

FIG. 15 is a block diagram of an exemplary object of interest (e.g., mobile or stationary source object) implemented in accordance with the present invention.

Figure 16:
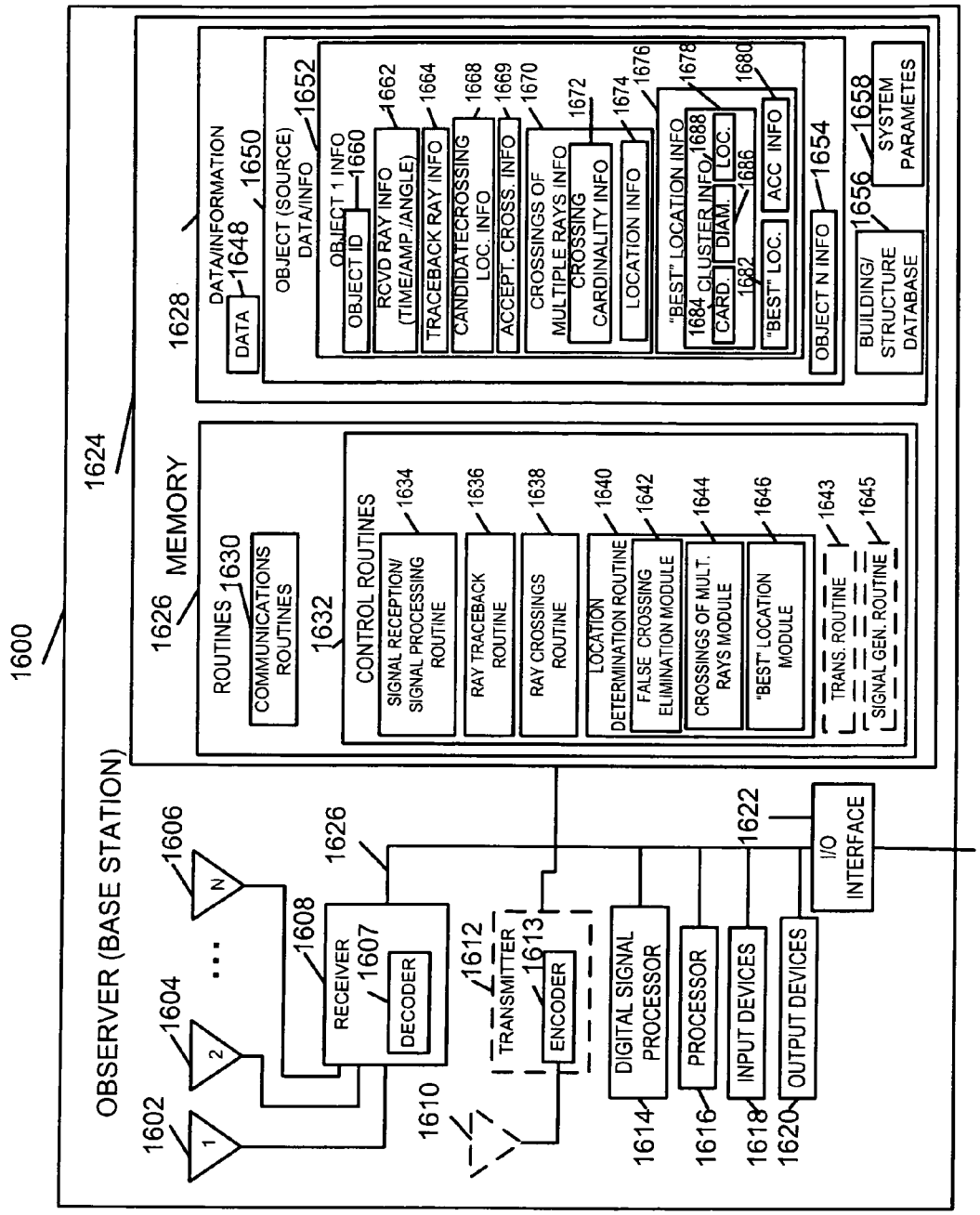

FIG. 16 is a block diagram of an exemplary observer (e.g., base station) implemented in accordance with the present invention.

§ 4. DETAILED DESCRIPTION OF THE INVENTION

The present invention involves novel methods, apparatus and data structures for locating an object of interest. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

§ 4.1 Exemplary Environment

Figure 1:
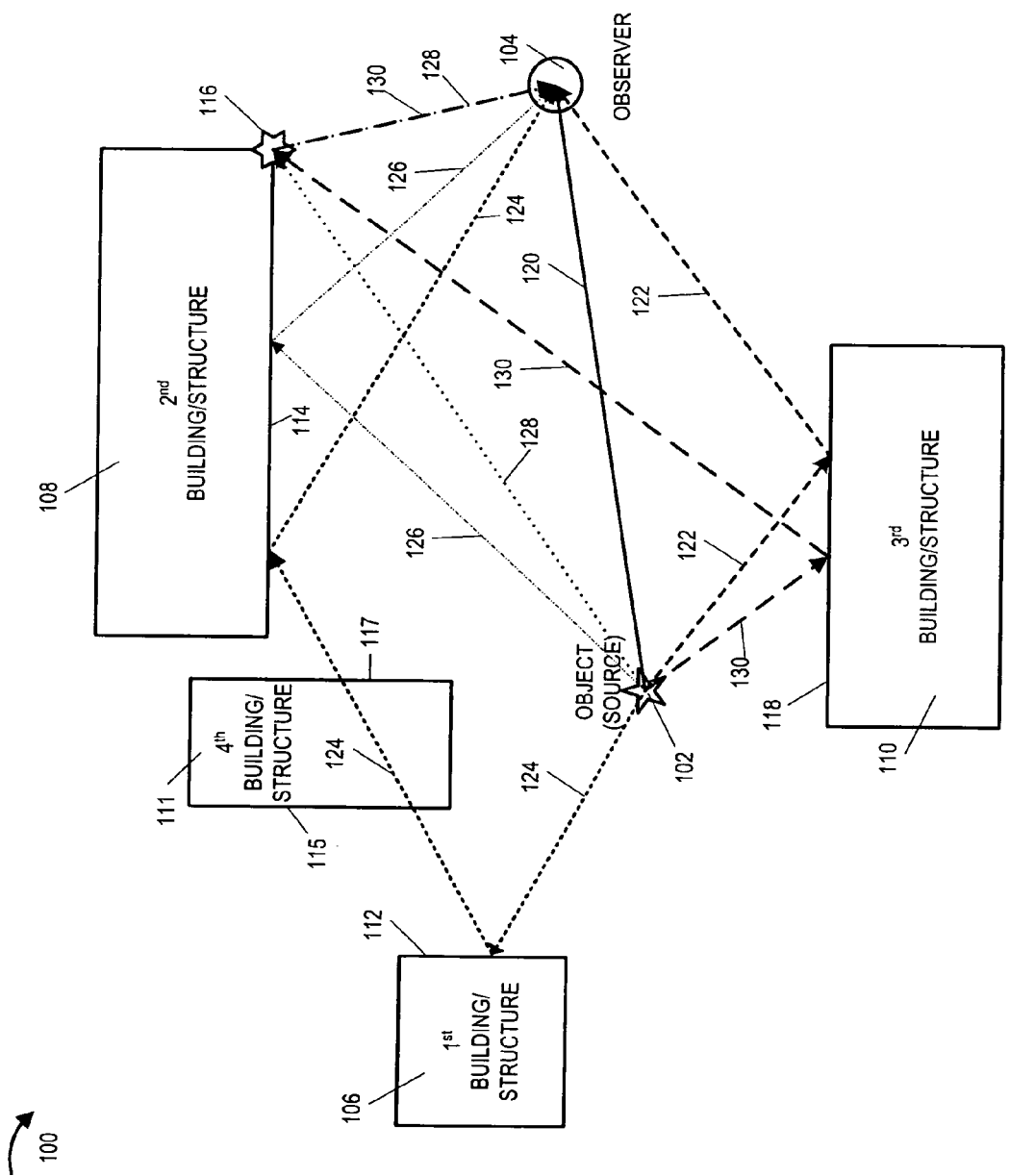
FIG. 1 is a block diagram of an exemplary environment in which the present invention may be used, an exemplary system implemented in accordance with the present invention, and exemplary source rays.

FIG. 1 illustrates an environment 100 in which the present invention may be used. FIG. 1 includes an object of interest 102 to be located, an observer 104, a first building/structure 106, a second building/structure 108, a third building/structure 110, and a fourth building/structure 111. First building/structure 106 includes a refection surface 112 (e.g., a wall). Second building/structure 108 includes a refection surface 114 and a diffraction surface 116 (e.g., a corner). Third building/structure 110 includes a refection surface 118. The fourth building/structure 111 includes horizontal edges 115 and 117 that may be responsible for diffraction of a ray over the building/structure 111. The object of interest 102 may be any object that emanates rays (e.g., an object including a transmitter). The object of interest 102 need not have any special modifications to be located in accordance with the invention. For example, the object of interest 102 may be a standard mobile phone. The object of interest 102 may be a mobile device or stationary device acting as a ray emanating source, and object of interest 102 may, in some embodiments, be implemented in accordance with the present invention. The observer 104 may be, e.g., a base station, implemented in accordance with the present invention.

It is assumed that rays emanate from the object of interest 102, some of which will reach the observer 104. FIG. 1 shows the projections into the horizontal plane of six exemplary rays: Ray A 120, Ray B 122, Ray C 124, Ray D 126, Ray E 128, and Ray F 130 emanate from object of interest 102 and reach observer 104. Rays emanating from object of interest 102 can reach observer 104 and may propagate directly or may reflect and/or diffract. Each ray may be classified in one of four categories: direct propagation, including rays that may undergo reflection from the ground and/or diffraction over the tops of buildings; rays that experience reflection at the vertical sides of buildings; rays that experience diffraction at the vertical corners of buildings; and rays that experience a combination of reflection and diffraction at the vertical sides and corners of buildings. Note that when a ray, such as Ray C 124 in FIG. 1, undergoes diffraction at horizontal edges, its projection into the horizontal may have slight bends at the edges, which are not shown in FIG. 1.

Although each of the ray types is shown in FIG. 1, each of the ray types need not be present for the multipath ray location method of the present invention. Indeed, the advantages of the present invention are clearly evident over other techniques where direct propagation rays are not available.

Although the present invention is illustrated in this application for exemplary cases of locating the object in two-dimensions, the methods of the invention are also applicable for three-dimensional cases. In addition, by repeating the implementation of the location method of the invention for the same source object over a given time interval, heading, velocity, and/or acceleration information on the object of interest may be obtained.

FIG. 2 is a table 200 describing each of the rays 120, 122, 124, 126, 128, 130, whose projections into the horizontal plane are shown in FIG. 1. First column 202 of Table 200 lists the rays. Second column 204 lists the number of reflections, if any, encountered by each ray along its path from object of interest (source) 102 to observer 104. Third column 206 lists the number of diffractions at vertical building corners, if any, encountered by each ray along its path from object of interest (source) 102 to observer 104. Fourth column 208 lists the surfaces, if any, encountered by each ray along its path from object of interest (source) 102 to observer 104. Fifth column 209 lists the building that each ray goes over along its path from object of interest (source) 102 to observer 104.

First row 210 describes ray A 120 which is a direct propagation ray and therefore has 0 reflections at the vertical sides of buildings and 0 diffractions at vertical building corners. Second row 212 describes ray B 122 which is a reflection ray and experiences one reflection off third building reflection surface 118. Third row 214 describes ray C 124 which is a reflection ray and experiences two reflections; a first reflection occurs off first building reflection surface 112, and a second reflection occurs off second building reflection surface 114, as well as going over building 111 possibly by diffraction at edges 115 and 117. Fourth row 216 describes ray D 126 which is a reflection ray and experiences one reflection off second building reflection surface 114. Fifth row 218 describes ray E 128 which is a diffraction ray and experiences one diffraction off second building diffraction surface 116. Sixth row 220 describes ray F 130 which is a combination reflection/diffraction ray and experiences one reflection off third building reflection surface 118 and a diffraction off second building diffraction surface, corner 116.

The various rays 120, 122, 124, 126, 128, and 130 differ from each other in one or more of the following characteristics:

(1) direction of arrival at observer 104;
(2) power (or amplitude) at observer 104; and
(3) travel time from object of interest (source) 102 to observer 104.

The direction of arrival of a ray at the observer 104 is a function of the building topography, which in turn determines those ray paths that satisfy the laws of ray optics. The power of the ray at the observer is a function of (i) reflection and (ii) diffraction events along the ray path, and (iii) the lengths of the ray segments. The travel time (or delay time) it takes a ray travel from the object of interest (source) 102 to the observer 104 is a function of the total distance that the ray travels along its path from object of interest (source) 102 to observer 104.

These three attributes: angle of arrival, power at observer, and travel time may be used to define a unique set of characteristics for each ray. Those unique sets of characteristics for each ray associated with the object of interest 102 may be used, in accordance with the invention, to facilitate locating object of interest 102.

§ 4.2 Functions that may be Performed

The present invention may function to determine the location of an object of interest (e.g., mobile or stationary ray emanation source) using multipath rays. In some embodiments, the present invention may also function to determine the velocity, acceleration, and/or heading of an object of interest. In some embodiments, the invention may also convey determined location, velocity, acceleration, heading, and/or accuracy information to the located object of interest.

§ 4.3 Exemplary Operations

Figure 3:
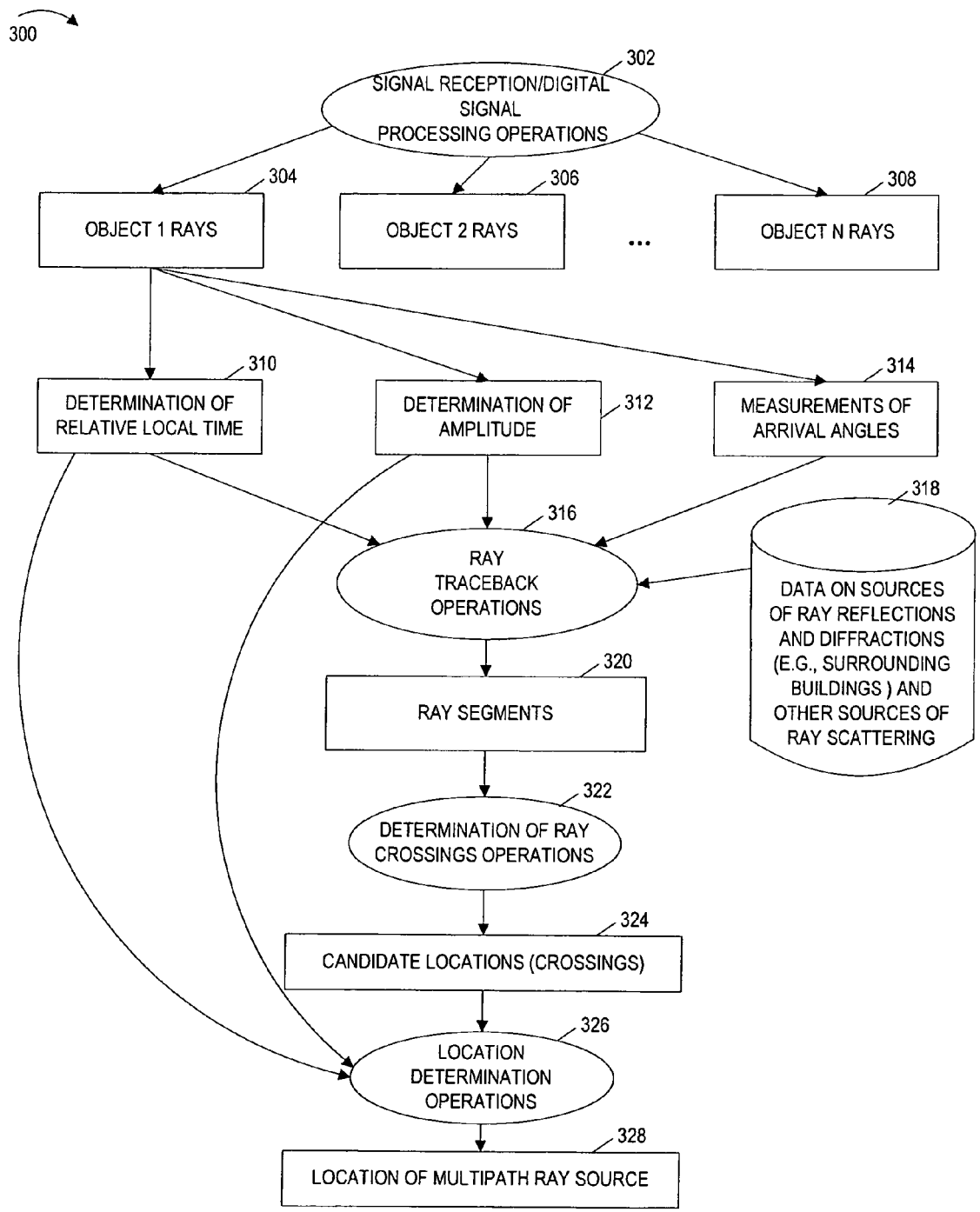
FIG. 3 is a bubble chart illustrating operations that may be performed by, and information that may be used, and/or generated by, the present invention.

FIG. 3 is a bubble chart 300 illustrating operations that may be performed, and information that may be used and/or generated in accordance with the present invention. In FIG. 3, operations are illustrated by ovals, while information is illustrated by rectangles and cylinders.

Signal reception/digital signal processing operations 302 may be performed by an observer (e.g., a stationary base station). In operations 302, signal reception may be performed by a plurality of antennas and receivers at the observer collecting each of the incoming rays emanating from one or more objects (sources). In operations 302, digital signal processing may be performed by the observer to perform preliminary filtering associating received rays with each of a plurality of objects of interest: object 1 rays 304, object 2 rays 306, object N rays 308. For example, the signal processing may perform bandpass filtering to obtain rays having a particular wavelength or frequency of interest. This wavelength or frequency may correspond to that of rays emanating from an object of interest. The digital signaling processing of operation 302 may also determine and record relative local time 310, amplitude 312, and/or angle of arrival 314 for rays associated with each of one or more of the objects 304, 306, 308.

Ray traceback operations 316 may be performed, on each ray of interest, by a ray tracing computer using the received ray time, amplitude, and arrival angle information (310,312, 314) and information in database 318. Each ray may be traced back from the observer (base station) through the environment topography, which may include buildings, walls, rooftops, other sources of ray reflections, other sources of ray diffractions, etc. Each ray traced back may have multiple branches. Each branch may be referred to as a ray segment. The ray traceback operations may output a set of ray segments 320 for each ray.

Ray crossing determination operations 322 may be used to compare ray segments from each of the rays being processed for an object, to ray segments of a different ray for the same object. Each of the pairwise (or N-wise) ray crossings are determined in operation 322 and output as candidate locations (crossings) 324.

Location determining operations 326 may accept two or more of these candidate locations (pairwise crossings) 324 and uses time information 310 and/or amplitude information 312 to eliminate false crossings. If only one candidate crossing remains, that crossing may be considered to be the location of the object of interest 328, Otherwise, location determining operations 322 may then define groups of the remaining pairwise crossings (e.g., using circles of accuracy). Each crossing group may be referred to as a crossing of multiple rays with an approximate crossing location. Then, location determining operations 326 may group multiple crossings of multiple rays into clusters. Next, operations 326 may determine the "best" location using the crossings of multiple rays and clusters. The determined "best" location may then be output as the location of the multipath ray source 328.

§ 4.4 Exemplary Methods and Apparatus for Performing the Exemplary Operations

Exemplary methods that may be used to perform various operations of the present invention are described in § 4.4.1. Then, exemplary apparatus that may be used to perform various operations of the present invention are described in § 4.4.2.

§ 4.4.1 Exemplary Methods

§ 4.4.1.1 Signal Reception/Digital Signal Processing Operations

Figure 4:
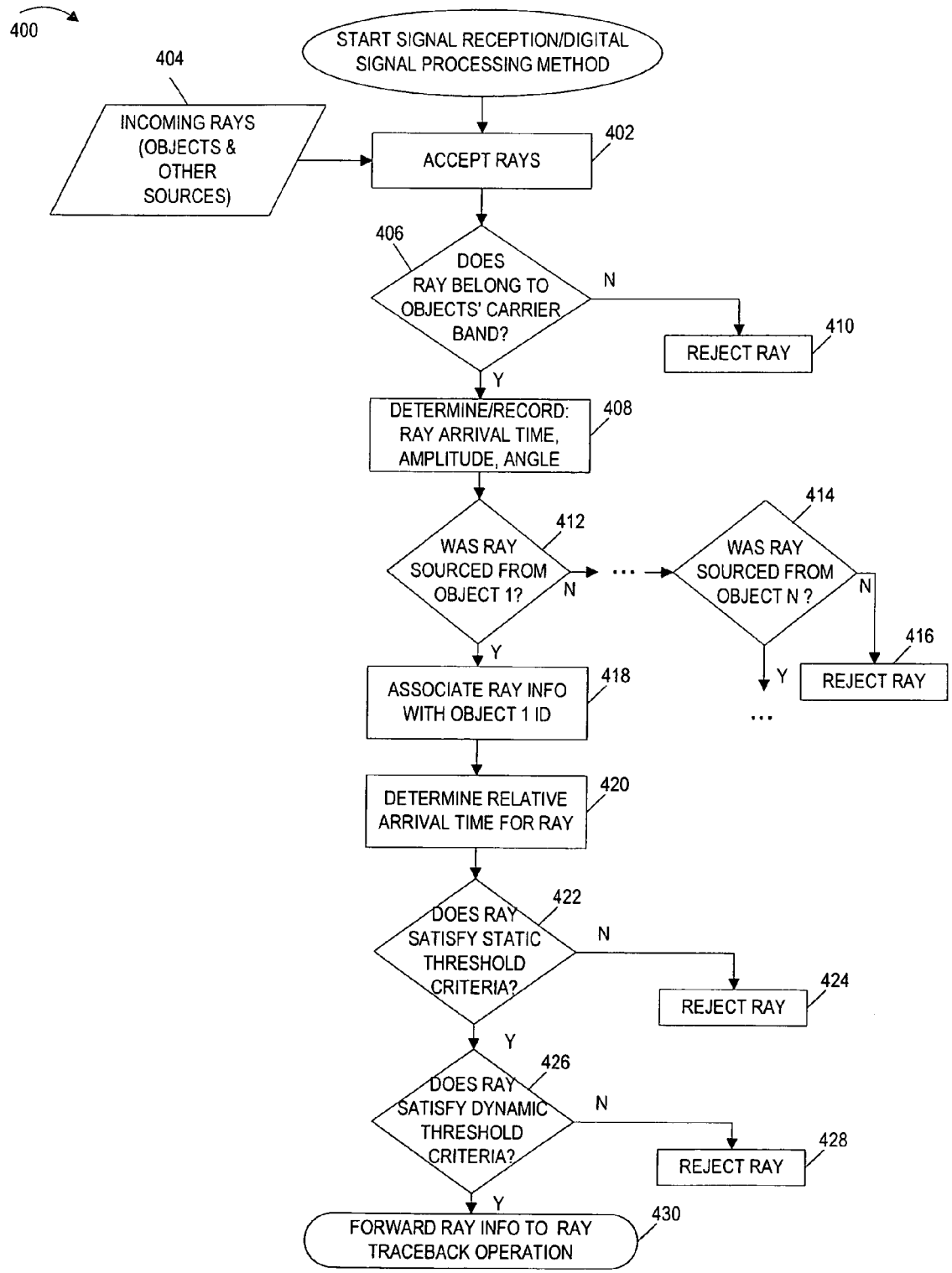
FIG. 4 is a flowchart illustrating an exemplary method for performing signal reception/digital signal processing in accordance with the present invention.

FIG. 4 is a flowchart 400 of an exemplary method that may be used to perform the signal reception/digital signal processing operations 302 of FIG. 3, in accordance with the present invention. In step 402, the observer (e.g., a base station) accepts incoming rays 404. In the signal reception operation, a plurality of antenna(s) and receiver(s) may be used to receive the rays transmitted by one or more of sources. Some of the incoming rays 404 may be from an object or objects (sources) of interest, while other incoming rays 404 may be from sources of no interest and may be treated as background noise. In step 406 the accepted incoming rays 404 may be screened. For example, the set of source objects of interest may be restricted to a specific frequency range or band (e.g., a 2.5 GHz carrier with a pre-defined bandwidth) and the antenna(s) and/or receiver(s) may be selected and/or adjusted to pass signals with frequencies within the selected band while rejecting signals with frequencies outside the selected band. If an incoming ray 404 does not belong to the carrier band(s) of the object(s) of interest, it is rejected in step 410. However, if the accepted ray 404 does belong to the carrier band(s) of the object of interest, then in step 408, the arrival time, the amplitude, and/or the angle of arrival is determined and recorded.

The digital signal processor may perform additional preliminary filtering to associate rays with an object (which may be one of a number of the potential source objects). For example, the rays associated with object 1, may be assigned to a limited frequency range within the carrier band, may include identification information unique to object 1, and/or may be encoded using a key (e.g., an encryption key) unique to object 1. In step 412 the digital signal processor determines whether the ray belongs to object 1 (which is the object of interest in this example). If the ray does not belong to object 1, then operation proceeds to step 414 where a test is performed for object N, etc. If in step 414, object N is the last object in the set of objects of interest, and the ray did not belong to object N, then the ray is rejected in step 416. However, if the ray was associated with object 1, operation proceeds to step 418, where the ray information 408 is tagged with an object 1 ID. In step 420, a relative arrival time for the ray may be determined based on the times associated with other rays for object 1.

In step 422, a pruning of rays may be performed using predetermined static thresholds (e.g., signal-to-noise thresholds that may be based on acceptable noise levels in the measurement of the angle of arrival, amplitude, and/or time of arrival). If the ray tested in step 422 has characteristics outside the desired ranges specified by the threshold criteria, the ray is rejected in step 424. Otherwise processing continues with step 426. In step 426, a pruning of rays may be performed by applying dynamic threshold levels. Dynamic threshold levels may be threshold levels which are not fixed universally but may vary as a function of one or more factors. Such factors influencing the dynamic thresholds may include the specific object, time, number of received rays, weather conditions, average received ray power, information about the ray power of other received rays, statistical variations in angle of received rays, statistical variations in arrival times, etc. For example, maximum and minimum dynamic threshold values may be applied to the recorded angle of arrival, time of arrival, and/or amplitude of the measured received signals. In some embodiments, the dynamic limits of step 426 may not be established and step 426 may not be performed until a set of rays for object 1 have been collected. If in step 426, the ray did not satisfy the dynamic threshold criteria, the ray is rejected in step 428; otherwise, in step 430 the ray information (and its associated object ID) is forwarded to the ray traceback operations 316 (of FIG. 3).

Although not shown, similar acts may be performed for one or more of N other objects of interest.

§ 4.4.1.2 Ray Traceback Operations

A set of rays which have passed screening tests and are associated with an object of interest are input to ray traceback operations. Ray traceback operations 316 (FIG. 3) may use standard or proprietary ray tracing techniques, such as the VPL code developed at Polytechnic University (See, e.g., G.Liang and H. L. Bertoni, "A new approach to 3-D ray tracing for propagation prediction in cities," *IEEE Trans. on Antennas and Propagation*, Vol. 46, No. 6, pp.853–863 (June 1998), which may use a database 318 of the buildings, structures, hills, mountains, cliffs, etc. (environmental topography) about the object of interest (source) and the observer. Ray traceback operations 316 may trace back each recorded ray of interest, that arrives at the observer (base station), backward from the observer, through the topography. Known ray traceback methods such as, e.g., an image method, a two-dimension pin cushion method, a three-dimension pin cushion method, the vertical plane launch (VPL) method, the vertical plane-slant method and methods for building databases may be used. (See, e.g., Henry L. Bertoni (Polytechnic University), "Radio Propagation", *Radio Propagation Encyclopedia of Physical Science and Technology*, Third Edition, Volume 13, pp. 769–792, (2002); and Henry L. Bertoni (Polytechnic University) and Saul A. Torrico (Comsearch), "Propagation Predictions for Urban Systems", *Handbook of Antennas in Wireless Communications*, Chapter 3, pp. 3-1 to 3-32, (CRC Press LLC., 2002), each of which is incorporated herein by reference).

Figure 5:
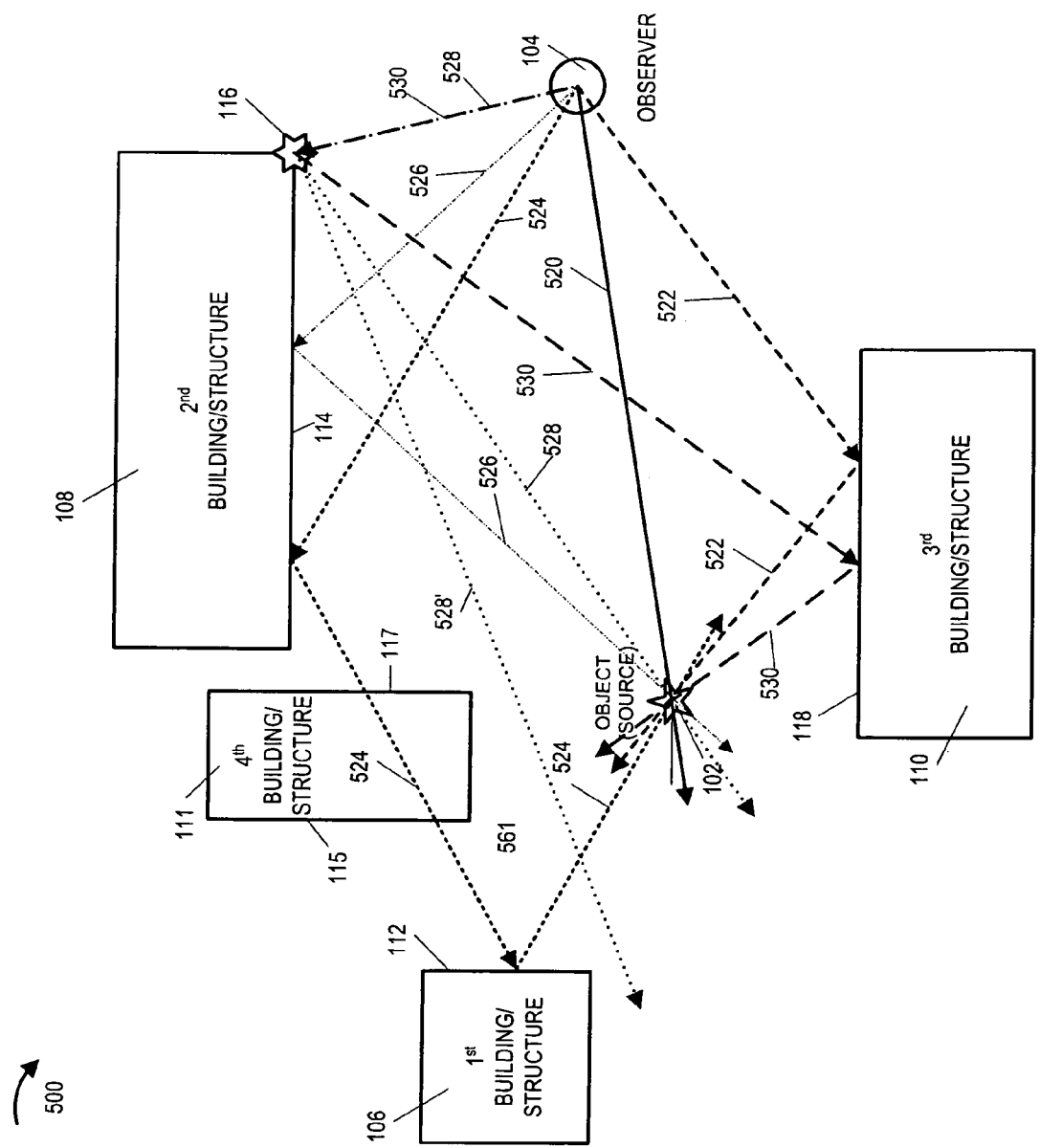
FIG. 5 is a block diagram illustrating an exemplary ray trace resulting from a ray traceback operation in accordance with the present invention.

An example of such a ray traceback is illustrated in block diagram 500 of FIG. 5. The traceback of FIG. 5 is shown as being performed on the rays sourced (e.g., transmitted) in FIG. 1. In addition to the elements already described with respect to FIG. 1, FIG. 5 also includes exemplary traced back rays 520, 522, 524, 526, 528, 530 corresponding to transmitted rays 120, 122, 124, 126, 128, 130, respectively of FIG. 1. Each ray traced back from observer 104 may include one or more branches or segments. Although the paths of the traced back rays as shown in FIG. 5 coincide with the paths of the sourced rays of FIG. 1, in actual operation, the paths (of traceback rays and sourced rays) may not be precisely aligned. The degree of divergence may depend on a number of factors including the accuracy of the data in the database 318 on the buildings'/structures' reflection and diffraction surfaces, the accuracy of the received signal measurements, the accuracy of the geographic model, approximations made to accelerate the traceback procedure, etc. In addition, each diffraction point may produce numerous potential addition candidate ray segments. One exemplary additional ray segment caused by diffraction is included as ray segment 528' in FIG. 5. The outputs of the ray traceback operations 316 are the traced back rays 520, 522, 524, 526, 528, 528', 530 which may be a part of the sets of ray segments 320 (FIG. 3).

§ 4.4.1.3 Ray Crossing Determination Operations

Figure 6:
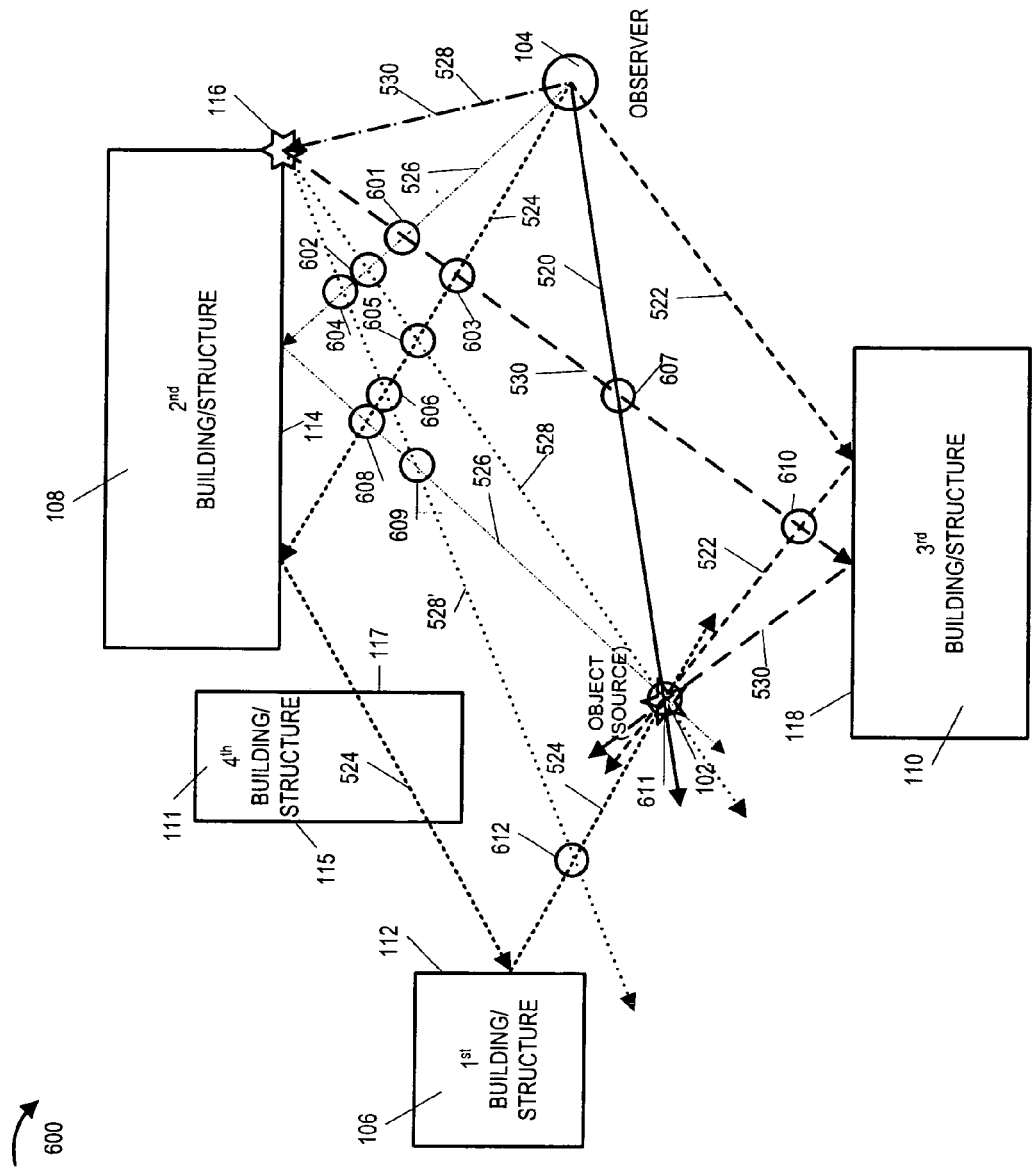
FIG. 6 is a block diagram illustrating exemplary pairwise candidate ray crossings resulting from a determination of ray crossings operation in accordance with the present invention.

Exemplary ray crossings determination operations 322 will now be described for the cases of locating the object in 2-D. Two (or more) (traceback) rays define a crossing if their projections into the horizontal plane intersect at one point. Two (traceback) rays may define multiple crossings as reflections and diffractions may result in several ray segments for each ray. Each traceback ray, when projected into the horizontal plane, may intersect with the projections into the horizontal plane of each other traceback ray one or more times. Many determined pairwise (or N-wise) (traceback) ray crossings are determined by this operation. FIG. 6 is a block diagram 600 including the elements of FIG. 5 and additional information. In FIG. 6, small circles identify twelve locations 601, 602, 603, 604, 605, 606, 607, 608, 609, 610, 611, and 612 where pairwise ray crossings occur on the traced back rays shown. At locations 601, 602, 603, 604, 605, 606, 607, 608, 609, 610, and 612 one pairwise crossing occurs. At location 611 coinciding with object of interest 102, fifteen pairwise crossings occur. Each of the pairwise crossings determined in this step are output as candidate locations (crossings) 324 (FIG. 3) of the object of interest (source) 102 to be located.

§ 4.4.1.4 Location Determining Operations

Figure 7:
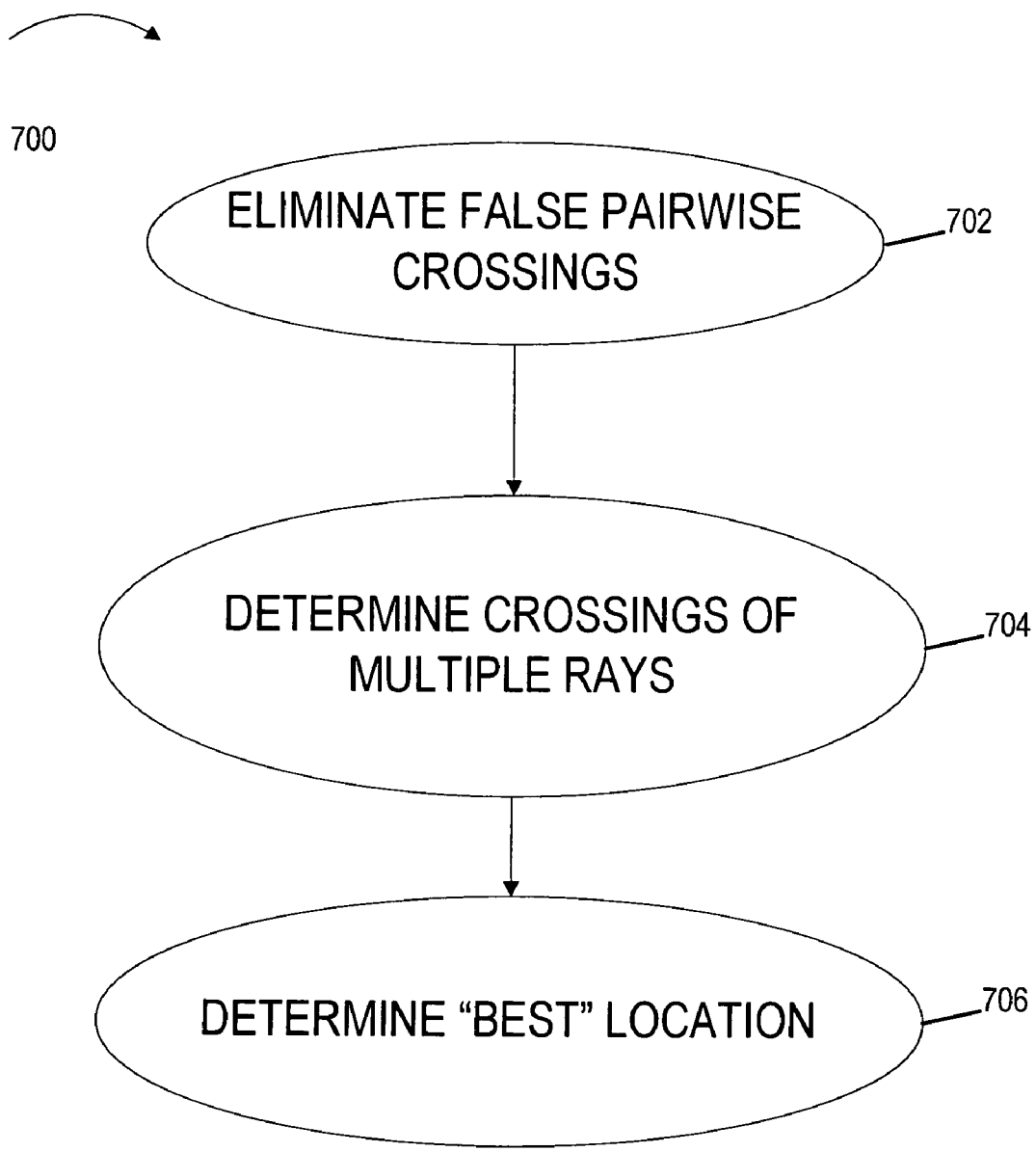
FIG. 7 is a bubble chart illustrating exemplary sub-operations that may be used by location determining operations in accordance with the present invention.

FIG. 7 is a bubble chart 700 listing the three sub-operations of the location determining operations 326 of FIG. 3. The location determining operations 326 include (i) operations 702 to eliminate false pairwise crossings of traceback rays, (ii) operations 704 to determine crossings of multiple rays and (iii) operations 706 to determine the "best" location of the object of interest.

§ 4.4.1.4.1 Elimination of False Crossings

False crossing elimination operations 702 of FIG. 7 may evaluate pairwise (or N-wise) candidate location crossings 324 and eliminate false crossings. Two rays traced back from an observer may include many branches or segments, and the two rays may cross at many locations, each crossing being a potential location of the object of interest. Each traceback ray may be paired with each other traceback ray. Each of the candidate crossings locations 324 may be tested for timing and/or amplitude consistency. The crossings of some ray tracebacks can be eliminated as locations because the relative time delay and/or amplitude is inconsistent with data collected on the incoming signal. Tracing additional rays back from the observer (base station), the intersection of its branches with the previous evaluated rays can be used to eliminate erroneous locations and confirm the actual location. Ideally, each of the rays traced back from the observer will have branches that intersect at the location of the object of interest with the correct (i.e., consistent) relative time delay and amplitude.

Diffraction at vertical building corners poses an interesting challenge since diffraction at a corner causes each incident ray to spread into many rays located in the surface of the diffraction cone. The method of the present invention may take candidate source rays of diffracted rays and combine them with relative time measurements to determine the corresponding crossing.

Figure 8:
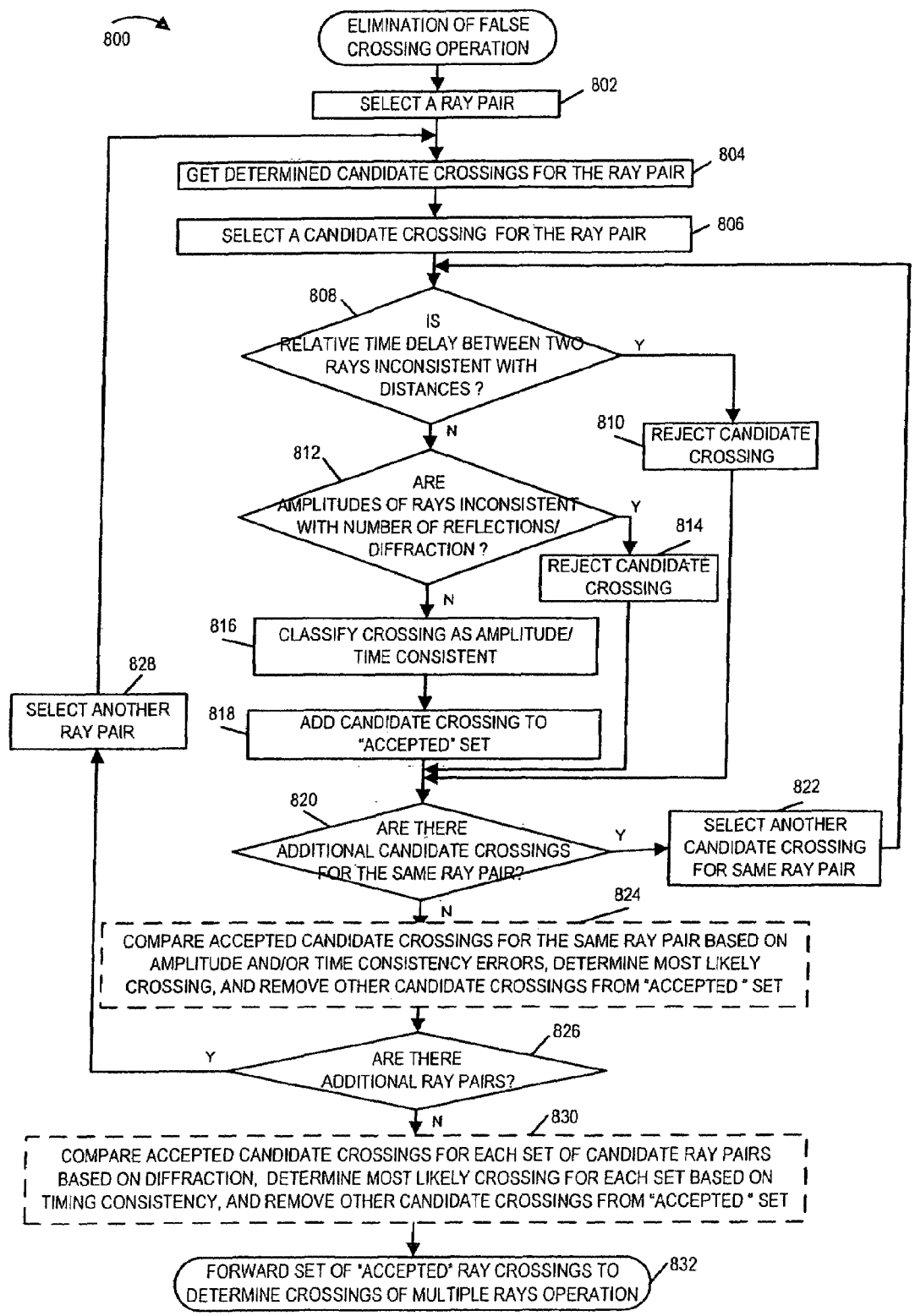
FIG. 8 is a flowchart illustrating an exemplary method that may be used to eliminate false crossings in accordance with the present invention.

FIG. 8 is a flowchart 800 illustrating an exemplary method that may be used to perform ray elimination crossing operations 702 of FIG. 7. In step 802, a ray pair is selected from the set of ray pairs including at least one candidate crossing. It is desirable to select a ray pair excluding diffraction rays and combination reflection/diffraction rays, if possible. In step 804, the determined candidate crossings corresponding to the most recently selected ray pair are obtained. In step 806, a candidate crossing for the ray pair is selected for evaluation. The selection may be based on an ordering sequence. For example, the candidate crossing may be selected in an order of their increasing distance from the observer (base station), starting with the closest crossing.

In step 808, the selected candidate crossing is tested to check if the relative time delay between the two rays is inconsistent with the ray traceback distances. If the time delay is inconsistent, the candidate crossing is rejected in step 810. However, if the time delay is consistent (e.g., match within an acceptable tolerance), then operation proceeds to step 812.

In step 812, a test is performed on the amplitude of the rays with respect to the number of reflections and/or diffractions. For example, for each reflection of a ray off a specific known surface in the database, a sourced ray can be estimated to be reduced by a specific coefficient, e.g., about 0.5, which depends on the angle of incidence on the surface, and the materials making up the surface. Similarly, for each diffraction of a ray off a specific known surface in the database, a ray can be estimated to be reduced in amplitude by another specific coefficient, e.g., about 0.1, which depends on the angles of incidence and departure from the edge, and the materials making up the edge. For each of the rays in the pair, the expected amplitude reduction may be calculated based on: (i) the number of reflections and/or diffractions encountered between the candidate crossing and the observer (base station); (ii) the estimated amplitude reflection and diffraction coefficients included in the database; and/or (iii) the distance of the traceback ray path. Then the expected amplitude information, based on the object of interest (source) being located at the candidate crossings, is compared to the measured amplitude information for consistency. For example, the ratio of the expected amplitudes for the ray traceback pair may be compared to the actual measured amplitude ratio of the received ray pair. If the results are inconsistent, the candidate crossing is rejected in step 814. However, if the results are consistent (e.g., match within an acceptable tolerance), the candidate crossing is classified as an amplitude/time consistent crossing in step 816 and added to an "accepted" set of crossings in step 818.

Operation proceeds from step 810, 814 or 818 to step 820. In step 820 a check is performed to determine whether there are any additional candidate crossings for the same ray pair which have not been evaluated. If there are additional candidate crossings to be tested, operation proceeds to step 822. In step 822 another candidate crossing for the same ray pair is selected. The selection in step 822 may be based on an ordering sequence, e.g., the closet candidate crossing to the observer (base station) which has not yet been evaluated is selected. From step 822 operation proceeds to step 808, where testing of the selected candidate crossing begins.

However, in step 820 if there were no additional candidate crossings remaining to be tested for the ray pair, operation proceeds, in some embodiments to step 824 or, in other embodiments, directly to step 826.

In step 824, if multiple candidate crossings have been accepted in step 818 for a ray pair, additional screening may be performed to eliminate some of the accepted ray pairs. Comparisons may be performed based on the levels of timing and/or amplitude consistency errors determined in steps 808 and 812 for each of the accepted candidate crossing for the ray pair. One accepted crossing may be determined to be the most likely crossing for the ray pair, and the other crossings for the ray pair may be removed from the "accepted" set. From step 824, operation proceeds to step 826.

In step 826, a check is performed as to whether there are any additional ray pairs remaining having candidate crossings which have not been evaluated for timing and/or amplitude consistency. If such additional ray pairs exist, operation proceeds to step 828, where another ray pair is selected. In some embodiments, the selection of step 828 may be such that direct propagation and/or reflection traceback ray pairs are selected before diffraction and/or combination reflection/diffraction traceback rays are selected. From step 828 operation proceeds to step 804, where the candidate crossings for the selected ray pair are obtained.

However, if in step 826, no additional ray pairs remain to be evaluated, operation may proceed to step 830. Step 830 is optional and may be used to eliminate false crossings of candidate diffraction traceback rays. For each diffraction at a vertical edge, a number of candidate traceback rays may have been generated by the ray traceback operation 326. The intersection of those candidate diffraction traceback rays with a different ray (e.g., a pure reflection ray) may form a set of diffraction candidate ray pairs. Each of the diffraction candidate ray pairs may have crossings within the "accepted" set formed in step 818. A comparison may be performed using the level of the timing consistency measurements of step 808 for each of the accepted candidate crossings of the diffraction candidate ray pairs. For each set of candidate diffraction ray pairs, the accepted candidate crossing with the smallest timing consistency error may remain in the "accepted" set, while the other candidate crossing(s) may be eliminated from the "accepted" set.

In step 832, the set of "accepted" ray crossings is provided to the determine crossings of multiple rays operation 704 (FIG. 7), In some embodiments, evaluation of additional potential candidate crossings for a ray pair may be terminated if one ray pair provides timing and/or amplitude consistency check errors less than specific limits (i.e., if there is a high confidence in the crossing). In some embodiments, all of the potential ray pairs might not be evaluated, but rather a subset of the total number of ray pairs may be evaluated. For example, evaluation may continue until a specified number of ray pairs have yielded a candidate crossing (or a predetermined number of candidate crossings, or a predetermined number of highly confident candidate crossings, etc.) in the "accepted" set.

FIG. 9 comprises FIG. 9a, FIG. 9b, and FIG. 9c. FIG. 9a includes a block diagram 900 which includes elements from FIG. 6 and illustrates the elimination of a ray crossing using relative timing and/or amplitude, in accordance with the invention.

FIG. 9a includes traceback ray pair 524/526. FIG. 9a illustrates traced back ray 524 as including ray sub-segment 524a, ray sub-segment 524b, ray segment 524c, which goes over building/structure 111, and ray sub-segment 524d. FIG. 9a also illustrates traceback ray 526 as including ray segment 526a, ray sub-segment 526b and ray sub-segment 526c. The source ray corresponding to composite traceback path (524a+524b+524c+524d) took longer to reach observer 104 than the source ray corresponding to composite traceback path (526a+526b+526c) because of the difference in their path lengths. That relative timing difference, corresponding to a path length difference of the received source rays, had been previously determined and stored by the observer 104. When candidate ray crossing 608 is tested for timing consistency, the distance of ray sub-segment 524a may be subtracted from the distance of (ray segment 526a+ray sub-segment 526b). A comparison may be performed between the sourced ray timing information and the candidate crossing location information. The comparison indicates that the timing information is inconsistent and the candidate crossing 608 should be rejected.

Graph 950 of FIG. 9b shows ray pair differences (expressed in distance or relative timing) on vertical axis 952 illustrating the comparison between sourced rays 956 and candidate crossing location traceback information 958.

Now consider the ray candidate testing at candidate ray crossing 608 for the same ray pair based on amplitude. Received ray amplitude information was measured and stored upon reception at the observer 104. The amplitudes of the received rays at observer 104 may be a function of: the path length, the number of reflections, the amplitude loss due to each reflection, the number of diffractions, and the amplitude loss due to each diffraction.

For simplicity of explanation, first consider the effect of reflections without considering the impact of path length. Assume a 0.5 amplitude reduction coefficient for each reflection. The source ray corresponding to traceback path 524 was reflected twice and therefore has its amplitude reduced by a factor of 0.5×0.5=0.25. The source ray corresponding to traceback path 526 was reflected once and therefore experienced an amplitude reduction of approximately 0.5 due to a reflection. The amplitude ratio due to the impact of reflections for paths 524/526 is approximately 0.25/0.5=0.5. Now consider candidate crossing 608. Path 524a experiences no reflections and therefore should maintain full amplitude, while path (526a+526b) experiences one reflection and should experience a reduction by the factor 0.5. The ratio of amplitudes 524a/(526a+526b) due to the influence of reflections=(1/0.5=2).

In addition when considering amplitudes of each traceback ray, the path lengths of each traceback ray and any diffraction loss in going over the tops of buildings/structures may be considered in the amplitude calculations. The received signal amplitude will be a function of the path length. More specifically, amplitude may be inversely proportional to a power of the path length. For simplicity of explanation, now consider the effect of path length on signal amplitude independent from the impact due to reflections. In the example of FIG. 9a, the source ray path along 524 (524a+524b+524c+524d) is longer than the source ray path along 526 (526a+526b+526c). Therefore, at observer 104, the measured signal strength (amplitude) for the ray along path 524 is expected to be weaker than the signal strength for the ray along path 526. However, at candidate crossing 608, the reverse is true when paths (524a) and (526a+526b) are considered. Similarly, diffraction loss may occur at the horizontal building/structure edges 115 and 117 that may make the signal strength (amplitude) for the ray along path 524 even weaker compared to the ray 526. In contrast this amplitude reduction is not obtained when the path (524a) is compared to (526a+526b).

In the example of FIG. 9a, the reflection factor, the path length factor, and the possible diffraction loss in going over a building/structure drive the expected ray pair amplitude ratio (candidate location) away from the measured ray pair amplitude ratio. Therefore, since the measured amplitude signal ratio does not match the candidate location amplitude signal ratio, the candidate location is rejected because of inconsistent amplitudes.

Graph 970 of FIG. 9c shows ray pair amplitude ratio on vertical axis 972 illustrating the comparison between amplitude ratio information based on measured received source rays 976 and expected amplitude information based on the candidate crossing location 978.

FIG. 10 comprises FIG. 10a and FIG. 10b. FIGS. 10a and 10b are a block diagram 1000 and a graph 1050, respectively, illustrating multiple candidate diffraction rays (1016', 1016'', 1016''') and selection based on relative timing/distance consistency. Block diagram 1000 shows an object of interest to be located (source) 1002, an observer (base station) 1004, a building 1006 with a diffraction surface (corner) 1008, a first candidate crossing location 1010, a second candidate crossing location 1012, and a third candidate crossing location 1014. Traceback ray 1018 includes ray sub-segments 1018a, 1018b, and 1018c. Candidate diffraction traceback ray 1016' includes ray segment 1016a and ray sub-segment 1016b. Candidate diffraction traceback ray 1016'' includes ray segment 1016a and ray sub-segment 1016c. Candidate diffraction traceback ray 1016''' includes ray segment 1016a and ray sub-segment 1016d. First candidate location 1010 is the intersection point of traceback ray 1016' and traceback ray 1018. Second candidate location 1012 is the intersection point of traceback ray 1016'' and traceback ray 1018. Third candidate location 1014 is the intersection point of traceback ray 1016''' and traceback ray 1018.

The relative timing information for the received ray pair transmitted from source 1002 to observer 1004 may be determined and stored at reception. That relative timing can be converted into a distance difference between the two ray paths. Each of the three candidate locations 1010, 1012, 1014 has different distance differences. The distance difference at first candidate location 1010 is path distance (1016a+1016b)−(1018a). The distance difference at second candidate location 1010 is path distance (1016a+1016c)−(1018a+1018b). The distance difference at third candidate location 1014 is path distance (1016a+1016d)−(1018a+1018b+1018c). The distance difference which matches the measured timing difference, namely at second candidate location 1012 is the correct location.

Graph 1050 illustrates ray pair difference (in distance or timing) 1052 as a function of candidate location 1054 for the example of block diagram 1000. It may be observed that different levels exist for each candidate location. Level 1060 corresponds to candidate location 1014; level 1058 corresponds to candidate location 1058; level 1056 corresponds to candidate location 1010.

§ 4.4.1.4.2 Multiple Rays Crossing Determination Operations

Ideally, the (e.g., pairwise) crossings, would lead to multiple ray crossings at the same point (as shown in FIG. 6). However, due to the inherent errors in measurements, inaccuracies of the topography database 318, approximations used in modeling ray traceback operations 316, it is probable that a true crossing point of multiple rays will manifest itself in the output 324 as pairwise crossings which are close together. The present invention may use a circle of accuracy method to group multiple pairwise crossings into crossing groups. More specifically, for each crossing group, the present invention may convert the multiple pairwise crossings, within the group, into one crossing of multiple rays having a cardinality of the crossing. The cardinality of the crossing is defined as the number of multiple rays that cross within the group. Each crossing of multiple rays has a defined position (e.g., the center of its corresponding circle of accuracy).

FIG. 11 is a flowchart 1100 illustrating an exemplary method that may be used to perform multiple rays crossing determination operations in accordance with the present invention. In step 1102, a circle of accuracy is defined for a multiple crossing group. The radius of the circle of accuracy (a distance) may be fixed, or may be adjusted using a number of factors including number of consistent pairwise crossings to be grouped, topography, and/or location accuracy requirements.

In step 1104, crossing groups are formed from the remaining pairwise crossings 1106 (which have not been eliminated) such that each pairwise crossing is in at least one group and each group includes the maximum number of pairwise crossings possible.

In step 1108, a location of each crossing group referred to as "a crossing of multiple rays" (an approximate crossing location for multiple rays) is determined (e.g., as the center of each circle of accuracy).

In step 1110, for each crossing of multiple rays, a cardinality of the crossing may be determined. The cardinality of the crossing is a count of the number of multiple rays which were part of the corresponding crossing group.

In step 1112, the crossing(s) of multiple rays information is forwarded to the determine "best" location operation 706 (FIG. 7).

FIG. 12 is a block diagram 1200 illustrating an exemplary multiple crossing group with a circle of accuracy, in accordance with the invention. FIG. 12 includes an object of interest to be located (source) 1202, observer 1204 (including ray trace back capability), three buildings 1206, 1208, 1210, three reflective surfaces 1212, 1214, 1218, one diffractive surface 1216. FIG. 12 also shows traceback rays 1220, 1222, 1224, 1226, 1228, 1230. FIG. 12 includes a number of exemplary pairwise crossings, which have not been eliminated, existing within a crossing group with circle of accuracy 1250, in accordance with the invention. FIG. 12 also includes a crossing of multiple rays 1252 with a cardinality of the crossing equal to six.

§ 4.4.1.4.3 "Best" Location Determination Operations

It is possible that after forming multiple crossing groups in operation 704 (FIG. 7), multiple crossing groups will exist, each corresponding to multiple rays crossing at one approximate point (a crossing of multiple rays). Based upon the data of these crossings, further procedures may be used to determine the "best" (best guess) location.

A combination of parameters may be used to determine the "best" location. Such parameters may include:
  (a) The cardinality of the crossing for each crossing of multiple rays. The maximum number of ray segments that cross at any given approximate point is defined as the cardinality of the crossing. In general, the crossing of multiple rays with maximum cardinality is more likely to be the closer to the correct object of interest (source) location than any other crossing of multiple rays.
  (b) If there are multiple crossings of multiple rays, the distance between the crossings of multiple rays may be significant. The crossings of multiple rays may form a cluster which has two attributes:
    a. diameter (maximum distance between any two crossings of multiple rays in this cluster is less than distance D).
    b. cardinality of the cluster (cluster cardinality) which is the number of crossings of multiple rays that fall in the cluster.

A cluster with smallest diameter and/or largest cluster cardinality may be considered to be the best location.

A score which is a function of cluster diameter and/or cluster cardinality may be determined, and the cluster with the highest score may include the "best" location.

In general, the "best" location may be a function of crossing cardinality, cluster cardinality, and/or cluster diameter.

FIG. 13 is a flowchart 1300 illustrating an exemplary method that may be used to perform the "best" location determination operations 706 (FIG. 7) in accordance with the present invention. In step 1302, a check may be performed to see if the cardinality of the crossing of one crossing of multiple rays is significantly higher (e.g. 50% higher) than the cardinality of the crossing of the other crossing(s) of multiple rays. If the cardinality of crossing of multiple rays is found to be significantly higher, then in operation 1304 the crossing of multiple rays corresponding to that high crossing cardinality may be selected as the "best" location.

However, if no single crossing of multiple rays has a predominately high cardinality, then in step 1306, clusters including the crossings of multiple rays may be defined, with the maximum distance between any two crossings of multiple rays in the cluster less than a distance D. Next, in step 1308, the cardinality of the cluster may be determined for each cluster. The cardinality of the cluster is the number of crossings of multiple rays in the cluster. In step 1310, the "best" location may then be determined as a function of cluster diameter and/or cluster cardinality, where a cluster with the smallest diameter and largest cluster cardinality may be considered to be the "best" location.

FIG. 14 is an exemplary illustration 1400 of multiple clusters, in accordance with the invention. FIG. 14 includes an object of interest to be located (source) 1402, a first cluster 1404, and a second cluster 1406. First cluster 1404 includes eleven crossings of multiple rays 1408, 1410, 1412, 1414, 1416, 1418, 1420, 1422, 1424, 1426, and 1428. Therefore, the cardinality of the first cluster is eleven. First cluster 1404 has a diameter, $D_1$ 1430 and a cluster location $CL_1$ 1432. Second cluster 1406 includes six crossings of multiple rays 1440, 1442, 1444, 1446, 1448, and 1450. The cardinality of the second cluster is six. Second cluster includes a diameter $D_2$ and a cluster location $CL_2$ 1454.

It may be observed that ($D_1 < D_2$) and the cluster 1 cardinality (11) is greater than the cluster 2 cardinality (6). Therefore, the location of cluster 1 ($CL_1$) 1432 is considered to be the "best" location, in accordance with one embodiment of the present invention.

§ 4.4.2 Exemplary Apparatus

FIG. 15 is a block diagram of an exemplary object of interest (source) 1500 that may be located in accordance with the invention. Object 1500 may be a more detailed representation of any of the objects of interest (sources) 102, 1002, 1202, 1402 of FIGS. 1, 5, 6, 9, 10, 12, or 14. Examples of an object of interest (source) 1500 may include, e.g., stand-alone multi-path locator transmitters, mobile phones, pagers, mobile data terminals, PDA, and other stationary or mobile communications devices which have been implemented in accordance with the invention, or which may simply emanate rays. In general, the object of interest may be anything that emanates rays and the object of interest need not be specially modified to be used by the invention. Thus, for example, a standard cell phone may function as an object of interest 1500.

Object of interest (source) 1500 may include a transmitter 1502 coupled to an antenna 1504, a receiver 1506 coupled to an antenna 1508, a processor 1510, an input device 1512, and output device 1514, an I/O interface 1516, and memory 1518 coupled together via bus/network 1520 over which the various elements may interchange data and information.

The transmitter 1502, which may include an encoder 1503, transmits signals (rays) from antenna 1504 along multiple paths, some of which may reach an observer 1600 (see FIG. 16). The multipath rays may be used by observer 1600 to locate object of interest (source) 1500. In some embodiments, multiple antennas 1504 may be used (e.g., in a system using multiple input and multiple output (MIMO) antennas at both ends of the signaling link.) Such MIMO systems may yield higher levels of signal energy recovery at observer 1600. In some embodiments, the encoder 1503 may encode the signals prior to transmission in order to associate the signals with the specific object of interest (source) 1500. The processor 1510, e.g., a CPU, may execute routines 1522 in memory 1518 and uses the data/information 1524 in memory 1518 to control the source object of interest 1500 to perform various operations which may include methods of the invention. In some embodiments, the methods of the present invention may be performed by observer 1600 while object of interest 1500 performs routine functions, e.g., normal communications on a standard cell phone. In some embodiments of object of interest (source) 1500, including a receiver 1506, receiver 1506 and antenna 1508 may receive information from the observer 1600 including the observer's determined "best" location information on the source object 1500. Input device 1512 may be, e.g., a switch, a keypad or microphone and may be used for: initiating the transmission of source signaling used for multipath locating, requesting an observer 1600 to initiate location finding, and/or requesting an observer 1600 to transmit source object 1500 location information. Output devices 1514 may include, e.g., displays, speakers, etc., and may be used for indicating that source signaling is being transmitted. Output devices 1514 may also be used to present determined location information 1542 received from an observer 1600 to the user of object 1500. I/O interface 1516 may provide an interface coupling source object 1500 to other networks and/or devices, e.g., a navigation computer. Determined location information 1542 may be transmitted to other devices through I/O interface 1516.

Memory 1518 includes routines 1522 and data/information 1524. Routines 1522 may include a communications routine 1526, applications routines 1528, and control routines 1530 including a signal generation routine 1532, a transmitter control routine 1534, and a receiver control routine 1536. Data/Information 1524 may include user data 1538, identification information 1540, and location information 1542. The communications routine 1526 may implement various communications processes used by the source object 1500. The applications routines 1528 may perform specific functions such as navigation, mapping location information 1542 on displays, etc. The signal generation routine 1532 may use data/information 1524 including the identification information 1540 to generate signals to be transmitted including the signals to be used by the observer 1600 as the multipath source rays, in accordance with the invention. Under the direction of the transmitter control routine 1534, the transmitter 1502 may encode (using encoder 1503) and transmit signals, including signals traveling as multipath rays and used for location determination in accordance with the invention, to the observer 1600. The receiver control routine 1536 may control operation of the receiver 1506 and decoder 1507 to receive signals from the observer 1600 including "best" location information 1542.

User data 1538 may include requests or information to be sent to the observer 1600. Identification information 1540 may include information that may be used by object of interest (source) 1500 in signals, signal generation, and/or signal transmission allowing the observer to identify rays sourced from object of interest 1500. Examples of identification information 1540 may include observer (base station) assigned ID, encryption keys, designated frequency bands, etc. Location information 1542 may include a "best" location position obtained by the observer 1600 and/or estimated accuracy information associated with "best" location value.

FIG. 16 is a block diagram of an exemplary observer, (e.g., base station) 1600 that may locate one or more objects of interest 1500 in accordance with the invention. In some embodiments, observer (base station) 1600 may be placed at an elevated location. Observer 1600 may be a more detailed representation of any of the observers (base stations) 104, 1004, 1204, 1404 of FIGS. 1, 5, 6, 9, 10, 12, or 14. Observer (base station) 1600 may include a plurality of antennas (antenna 1 1602, antenna 2 1604, antenna N 1606) coupled to a receiver 1608, an antenna 1610 coupled to a transmitter 1612, a digital signal processor 1614, a processor 1616, an input device 1618, an output device 1620, an I/O interface 1622, and memory 1624 coupled together via bus/network 1626 over which the various elements may interchange data and information.

The antennas 1602, 1604, 1606 may be multiple antennas and/or multiple antenna elements or segments and may be part of an array. The antennas may, in concert with receiver 1608, digital signal processor 1614, and/or other modules in observer (base station) 1600, measure the angle of arrival, time delay, and/or amplitude of the arriving rays. The antennas 1602, 1604, 1606, in concert with the receiver 1608 and digital signal processor 1614, may receive, decode, and/or process multipath ray signals in accordance with the invention. In some embodiments, the antennas 1602, 1604, and 1606 may be "smart" antennas. In some embodiments, the antennas 1602, 1604, and 1606 may be part of a MIMO antenna system. Such "smart" and MIMO systems may yield higher levels of signal energy recovery at observer 1600, and may allow for easier collection of individual ray characteristics. The transmitter 1612 may transmit determined location information 1676 to objects of interest 1500.

The processor 1616, e.g., a CPU, may execute the routines in memory 1626 and use the data/information 1628 in memory 1624 to control the observer (base station) 1600 to perform methods of the invention. Input device 1618 may be, e.g., a keyboard, and may be used for selecting specific objects 1500 to be located, adjusting rejection criteria, adjusting ranges, adjusting accuracy settings and/or initiating transmission of determined location information 1676 to an object of interest 1500. Output devices 1620 may include, e.g., displays, printers, etc., and may be used for indicating that object location is in progress, displaying location determination results, and/or outputting determined location information to an operator of the observer (base station) 1600. I/O interface 1622 may provide an interface coupling observer (base station) 1600 to other networks and/or the Internet over which determined object of interest 1500 location information 1676 may be transmitted.

Memory 1624 includes routines 1626 and data/information 1628. Routines 1626 may include a communications routine 1630 and control routines 1632. Control routines 1632 may include a signal reception/signal processing routine 1634, a ray traceback routine 1636, a ray crossings routine 1638, and a location determination routine 1640 including a false crossing elimination module 1642, a crossing of multiple rays module 1644, and a "best" location module 1646. Control routines 1632 may, in some embodiments, also include a transmitter routine 1643 and a signal generation routine 1645.

Data/information 1650 may include data 1648, a plurality of object of interest information 1652: object 1 information 1652, object N info 1654, a building structure database 1656, and system parameters 1658. Data 1648 may include received ray information which has not yet been associated with a specific object of interest.

Object 1 information 1652 may include an object ID 1660, received rays information 1662, traceback rays information 1664, candidate crossing location information 1668, accepted crossing information 1669, crossing of multiple rays information 1670, and "best" location information 1676. Object ID 1660 may include an observer (base station) assigned ID, an encryption key, and/or a band of frequencies associated with object 1. Received rays information 1662 may include relative timing information, amplitude information, and arrival angle information associated with each received ray associated with object 1. Traceback ray information 1664 may include traceback ray segments generated by the ray traceback routine 1636. Candidate crossing location information 1668 may include information on the pairwise crossings of traceback rays. Accepted crossings information 1669 may include a designated subset of the pairwise candidate crossings 1668, following execution of the false crossing elimination module 1642, which have not been eliminated due to inconsistencies in time or amplitude. Crossings of Multiple Rays information 1672 may include a location 1674 (an approximate crossing point for the multiple rays within a circle of accuracy), a crossing cardinality 1672 (number of rays associated with the multiple crossing point), and a list of rays associated with the crossing. "Best" location information 1676 may include cluster information 1678 including cluster cardinality 1684 (number of crossings of multiple rays within the cluster), diameter information 1686 (maximum distance between two points within the cluster is less than diameter), and a cluster location 1678. "Best" location info 1676 may also include a "best" location 1682 (determined in accordance with the invention), and accuracy information 1680 associated with the "best" location value 1680. "Best" Location information 1676 may, in some embodiments, also include velocity, acceleration, heading, velocity accuracy, acceleration accuracy, and/or heading accuracy information.

System parameters 1658 may include information such as the area of coverage to be considered, carrier frequency bands, the threshold levels for rejecting source rays, calibration information adjusting observer (base station) gains, adjustment information based on weather conditions, information (e.g., values) defining rejection criteria of pairwise crossings, information defining high confidence limits, information defining accepted ray pair sets, information, (e.g., values) defining areas(circles) of accuracy, and information (e.g., values) defining clusters.

Building structure database 1656 may include environmental topography information including geographic information on the buildings, structures, streets, mountains, hills, cliffs, vegetation, surroundings etc., in the area covered for location operations. Building structure database 1656 may also include information modeling the buildings, structures, streets, mountains, hills, cliffs, vegetation, surroundings, etc. in terms of reflection and diffraction surfaces including ray amplitude loss coefficients associated with the reflection and/or diffraction surfaces.

The communications routine 1630 may implement the communications protocols used by the observer (base station) 1600. Signal reception/signal processing routine 1634 may control the operation of the antennas 1602, 1604, 1606, receivers 1608 and digital signal processor 1614 to receive and filter received multipath ray information 1648 to the appropriate objects of interest 1500 to be located. The ray traceback routine 1636 may traceback the received rays associated with an object of interest 1662 to obtain a set of traceback ray segments 1664. The ray crossing routine 1638 may determine the intersection points of the traceback rays 1664, each intersection point representing a candidate location 1668. The false crossing elimination module 1642 may eliminate candidate pairwise ray crossings 1668 on the basis of inconsistent ray relative timing information and/or inconsistent ray amplitude information and output accepted crossing information 1669. The crossing of multiple rays module 1644 may group a number accepted pairwise ray crossings 1669 by a circle of accuracy into a single crossing of multiple rays 1670 with a crossing cardinality 1672 and approximate crossing location 1674. The "best" location module 1646 may group the crossings of multiple rays 1670 into clusters 1678, and determine a "best" location 1682 as a function of crossing cardinality 1672 and/or cluster information 1678 (cluster cardinality and/or diameter of cluster).

In some embodiments, "best" location module 1678 may also determine velocity, acceleration, heading, and/or accuracy information. The determination of velocity, acceleration and/or heading may be based upon a number of location determinations for the same object of interest 1500 performed over time.

Some embodiments may include a signal generation routine 1645 and a transmitter control routine 1645. The signal generation routine 1645 may generate signals including "best" information 1676 such as determined "best" location 1682 and accuracy information 1680 to be transmitted to a located object of interest 1500. The transmitter control routine 1643 may control the transmitter 1612 and encoder 1613 to encode and transmit signal output from signal generation routine 1645 to an object of interest 1500.

Various features of the present invention, in various embodiments, are implemented using modules. Such modules may be implemented using software, hardware, or a combination of hardware software. Many of the above described methods or method steps can be implemented using machine executable instructions, such as software included in a machine-readable medium such as a memory device (e.g., RAM floppy disk, etc.) to control a machine (e.g., general purpose computer with or without additional hardware) to implement all or portions of the above described methods. Accordingly, among other things, the present invention may be embodied as a machine-readable medium including machine executable instructions for causing a machine, to perform one or more of the steps of the above-described method(s).

Numerous additional variations on the methods and apparatus of the present invention described above will be apparent to those skilled in the art in view of the above description of the invention. Such variations are considered to be within the scope of the invention.

Ray tracing codes such at the VPL method developed at Polytechnic University require that the wavelength be small compared to building size, but large compared to the random irregularities of building walls. This requirement sets an approximate frequency range of 450 MHz to 6 GHz. Within this frequency range the ray tracing codes are accurate up to a distance of approximately 2 km from the location of the observer. The present invention is not limited to the requirements of this particular embodiment.

Accuracy of the location method may depend on the accuracy of the measurements of relative time of arrival of the various multipath components, on the accuracy of the angle of arrival measurements, and on the accuracy of the building database used for the traceback operation.

For application to third generation cellular systems having a bandwidth of 5 MHz, time of arrival measurements should easily be determined to $1/10$ of a symbol period, or 20 ns. This translates to a distance accuracy of 6 m.

Direction of arrival of individual multipath components can be measured with an accuracy of less than 1°, corresponding to a distance error of 16 m at a distance of 1 km from the observer. Building databases at typically have corner location accuracy of +/−0.5 m. This will have little effect on the location accuracy in the traceback if both corners of a building are offset by the same amount. However, if the two corners are offset different amounts it will result in a change in the orientation of the building wall, which in turn will distort the direction of the traceback rays reflected from the building wall. This effect could amount to several degrees.

The VPL method of ray tracing approximates the paths of the rays diffracted by horizontal building edges to have straight-line projections into to horizontal plane. While this approximation may introduce some error in the ray direction, it is expected to be no larger than the errors introduced by limited measurement accuracy and building database accuracy, as cited above.

Ten or more multipath signals are typically observed in measurements made with a dynamic range of 20 dB. Traceback of these rays will yield multiple candidate locations, which when suitably averaged or combined will reduce the errors introduced into the candidate locations by the various error sources.

What is claimed is:

1. A method for locating an object of interest, the method comprising:
   a) accepting at an observation point, signals emanating from the object;
   b) determining, for each of the accepted signals, a direction of arrival;
   c) determining at least two trace-back rays from the observation point using solely the direction of arrival of signals and topographical information;
   d) determining at least one candidate location at crossings of two or more trace-back rays;
   e) determining a set of final candidate locations from the determined candidate locations; and
   f) determining the location of the object of interest using the set of final candidate locations, wherein the act of determining the location of the object of interest using the set of final candidate locations includes
      i) defining an area of accuracy including at least one candidate location from the set of final candidate locations, and
      ii) determining the location of the object of interest using the defined area of accuracy,
   wherein at least two areas of accuracy are defined, and
   wherein the act of determining the location of the object of interest uses a cardinality of each of the areas of accuracy.

2. The method of claim 1 wherein the area of accuracy is a circle of accuracy.

3. A method for locating an object of interest, the method comprising:
   a) accepting at an observation point, signals emanating from the object;
   b) determining, for each of the accepted signals, a direction of arrival;
   c) determining at least two trace-back rays from the observation point using solely the direction of arrival of signals and topographical information;
   d) determining at least one candidate location at crossings of two or more trace-back rays;
   e) determining a set of final candidate locations from the determined candidate locations; and
   f) determining the location of the object of interest using the set of final candidate locations, wherein the act of determining the location of the object of interest using the set of final candidate locations includes
      i) defining an area of accuracy including at least one candidate location from the set of final candidate locations, and
      ii) determining the location of the object of interest using the defined area of accuracy,
   wherein at least two areas of accuracy are defined, and
   wherein the act of determining the location of the object of interest includes
      A) defining at least one cluster, each cluster including locations of each of at least two areas of accuracy, and
      B) determining the location of the object of interest using the at least one cluster.

4. The method of claim 3 wherein the act of determining the location of the object of interest uses a location of the at least one cluster.

5. The method of claim 3 wherein at least two clusters are defined, each of the at least two clusters having an associated diameter and
   wherein the act of determining the location of the object of interest uses the diameter of each of the at least two clusters.

6. The method of claim 3 wherein at least two clusters are defined, each of the at least two clusters having an associated cluster cardinality, and
   wherein the act of determining the location of the object of interest uses the cluster cardinality of each of the at least two clusters.

7. The method of claim 3 wherein at least two clusters are defined, each of the at least two clusters having both an associated diameter and an associated cluster cardinality, and
   wherein the act of determining the location of the object of interest uses the cluster cardinality and the diameter of each of the at least two clusters.

8. The method of claim 3 wherein at least two clusters are defined, each of the at least two clusters having associated areas of accuracy, each of the associated areas of accuracy having a cardinality, an associated diameter, and an associated cluster cardinality, and wherein the act of determining the location of the object of interest uses the cardinalities of the areas of accuracy associated with each of the at least two clusters, the diameters associated with each of the at least two clusters, and the cluster cardinalities associated with each of the at least two clusters.

9. A method for locating an object of interest, the method comprising:

a) accepting at an observation point, signals emanating from the object;

b) determining, for each of the accepted signals, a direction of arrival;

c) determining at least two trace-back rays from the observation point using solely the direction of arrival of signals and topographical information;

d) determining at least one candidate location at crossings of two or more trace-back rays;

e) determining a set of final candidate locations from the determined candidate locations; and f) determining the location of the object of interest using the set of final candidate locations, wherein the act of determining the location of the object of interest using the set of final candidate locations includes i) defining a volume of accuracy including at least one candidate location from the set of final candidate locations, and ii) determining the location of the object of interest using the defined volume of accuracy.

10. The method of claim 9 wherein the volume of accuracy is a sphere of accuracy.

11. The method of claim 9 wherein at least two volumes of accuracy are defined, and wherein the act of determining the location of the object of interest uses a cardinality of each of the volumes of accuracy.

12. The method of claim 9 wherein at least two volumes of accuracy are defined, and wherein the act of determining the location of the object of interest includes A) defining at least one cluster, each cluster including locations of each of at least two volumes of accuracy, and B) determining the location of the object of interest using the at least one cluster.

13. The method of claim 12 wherein the act of determining the location of the object of interest uses a location of the at least one cluster.

14. The method of claim 12 wherein at least two clusters are defined, each of the at least two clusters having an associated diameter and wherein the act of determining the location of the object of interest uses the diameter of each of the at least two clusters.

15. The method of claim 12 wherein at least two clusters are defined, each of the at least two clusters having an associated cluster cardinality, and wherein the act of determining the location of the object of interest uses the cluster cardinality of each of the at least two clusters.

16. The method of claim 12 wherein at least two clusters are defined, each of the at least two clusters having both an associated diameter and an associated cluster cardinality, and wherein the act of determining the location of the object of interest uses the cluster cardinality and the diameter of each of the at least two clusters.

17. The method of claim 12 wherein at least two clusters are defined, each of the at least two clusters having associated volumes of accuracy, each of the associated volumes of accuracy having a cardinality, an associated diameter, and an associated cluster cardinality, and wherein the act of determining the location of the object of interest uses the cardinalities of the volumes of accuracy associated with each of the at least two clusters, the diameters associated with each of the at least two clusters, and the cluster cardinalities associated with each of the at least two clusters.

18. The method of claim 9 wherein the act accepting at an observation point, signals emanating from the object, includes screening the signals using a physical characteristic of the signals.

19. The method of claim 9 wherein the act accepting at an observation point, signals emanating from the object, includes screening the signals using a bandpass frequency filter.

20. The method of claim 9 wherein the act accepting at an observation point, signals emanating from the object, includes screening the signals using a signal amplitude threshold.

21. The method of claim 9 wherein the act accepting at an observation point, signals emanating from the object, includes screening the signals using a signal-to-noise threshold.

22. The method of claim 9 wherein the act accepting at an observation point, signals emanating from the object, includes screening the signals using an angle of arrival threshold.

23. The method of claim 9 wherein the act accepting at an observation point, signals emanating from the object, includes screening the signals using a relative time of arrival threshold.

24. The method of claim 9 wherein the act accepting at an observation point, signals emanating from the object, includes screening the signal using information carried by the signals.

25. The method of claim 9 wherein the act of accepting at an observation point, signals emanating from the object, includes screening the signal using a unique identifier carried by the signals and associated with the object.

26. The method of claim 9 wherein the act accepting at an observation point, signals emanating from the object, includes screening the signal using both (A) a physical characteristic of the signals, and (B) information carried by the signals.

27. The method of claim 9 further comprising determining, for each of the accepted signals, (A) an associated time of arrival, and (B) an amplitude.

28. The method of claim 9 wherein the topographical information includes sources of signal reflection.

29. The method of claim 9 wherein the topographical information includes sources of signal diffraction.

30. The method of claim 9 wherein the topographical information includes building surfaces.

31. The method of claim 9 wherein the topographical information includes signal attenuation information.

32. The method of claim 9 wherein the act of determining a set of final candidate locations from the determined candidate locations includes eliminating at least some of the candidate locations using times of arrival associated with the signals from which trace-back rays were determined.

33. The method of claim 32 wherein a candidate location is eliminated if the times of arrival are inconsistent with expected times of arrival.

34. The method of claim 33 wherein a time of arrival is determined to be inconsistent with an expected time of arrival if they differ by more than a threshold difference.

35. The method of claim 9 wherein the act of determining a set of final candidate locations from the determined candidate locations includes eliminating at least some of the candidate locations using amplitudes associated with the signals from which trace-back rays were determined.

36. The method of claim 35 wherein a candidate location is eliminated if the amplitudes are inconsistent with expected amplitudes.

37. The method of claim 35 wherein an amplitude is determined to be inconsistent with an expected amplitude if they differ by more than a threshold difference.

38. The method of claim 9 wherein the act of determining a set of final candidate locations from the determined candidate locations includes eliminating at least some of the candidate locations using both times of arrival and amplitudes associated with the signals from which trace-back rays were determined.

39. The method of claim 9 wherein the act of determining a set of final candidate locations from the determined candidate locations includes
   i) determining if times of arrival of each of the accepted signals are inconsistent with expected times of arrival;
   ii) if it was determined that the times of arrival are inconsistent with expected times of arrival, then excluding the candidate location from the set of final candidate locations; and
   iii) if it was determined that the times of arrival are not inconsistent with expected times of arrival, then
      A) determining if amplitudes of each of the accepted signals are inconsistent with expected amplitudes, and
      B) if it was determined that the amplitudes are inconsistent with expected amplitudes, then excluding the candidate location from the set of final candidate locations.

40. Apparatus for locating an object of interest, the apparatus comprising:
   a) means for accepting at an observation point, signals emanating from the object;
   b) means for determining, for each of the accepted signals, a direction of arrival;
   c) means for determining at least two trace-back rays from the observation point using solely the direction of arrival of signals and topographical information;
   d) means for determining at least one candidate location at crossings of two or more trace-back rays;
   e) means for determining a set of final candidate locations from the determined candidate locations; and
   f) means for determining the location of the object of interest using the set of final candidate locations, wherein the means for determining the location of the object of interest using the set of final candidate locations include
      i) means for defining an area of accuracy including at least one candidate location from the set of final candidate locations, and
      ii) means for determining the location of the object of interest using the defined area of accuracy,
   wherein at least two areas of accuracy are defined, and
   wherein the means for determining the location of the object of interest use a cardinality of each of the areas of accuracy.

41. Apparatus for locating an object of interest, the apparatus comprising:
   a) means for accepting at an observation point, signals emanating from the object;
   b) means for determining, for each of the accepted signals, a direction of arrival;
   c) means for determining at least two trace-back rays from the observation point using solely the direction of arrival of signals and topographical information;
   d) means for determining at least one candidate location at crossings of two or more trace-back rays;
   e) means for determining a set of final candidate locations from the determined candidate locations; and
   f) means for determining the location of the object of interest using the set of final candidate locations, wherein the means for determining the location of the object of interest using the set of final candidate locations include
      i) means for defining an area of accuracy including at least one candidate location from the set of final candidate locations, and
      ii) means for determining the location of the object of interest using the defined area of accuracy,
   wherein at least two areas of accuracy are defined, and
   wherein the means for determining the location of the object of interest include
      A) means for defining at least one cluster, each cluster including locations of each of at least two areas of accuracy, and
      B) means for determining the location of the object of interest using the at least one cluster.

42. Apparatus for locating an object of interest, the apparatus comprising:
   a) means for accepting at an observation point, signals emanating from the object;
   b) means for determining, for each of the accepted signals, a direction of arrival;
   c) means for determining at least two trace-back rays from the observation point using solely the direction of arrival of signals and topographical information;
   d) means for determining at least one candidate location at crossings of two or more trace-back rays;
   e) means for determining a set of final candidate locations from the determined candidate locations; and
   f) means for determining the location of the object of interest using the set of final candidate locations, wherein the means for determining the location of the object of interest using the set of final candidate locations include
      i) means for defining a volume of accuracy including at least one candidate location from the set of final candidate locations, and
      ii) means for determining the location of the object of interest using the defined volume of accuracy.

* * * * *